(12) United States Patent
Child

(10) Patent No.: US 8,433,709 B2
(45) Date of Patent: Apr. 30, 2013

(54) MODULAR SYSTEM AND METHOD FOR MANAGING CHINESE, JAPANESE AND KOREAN LINGUISTIC DATA IN ELECTRONIC FORM

(76) Inventor: Warren Daniel Child, Chevy Chase, MD (US)

( * ) Notice: Subject to any disclaimer, the term of this patent is extended or adjusted under 35 U.S.C. 154(b) by 176 days.

(21) Appl. No.: 12/744,801

(22) PCT Filed: Nov. 25, 2008

(86) PCT No.: PCT/US2008/084755
§ 371 (c)(1),
(2), (4) Date: May 26, 2010

(87) PCT Pub. No.: WO2009/070619
PCT Pub. Date: Jun. 4, 2009

(65) Prior Publication Data
US 2011/0320468 A1 Dec. 29, 2011

Related U.S. Application Data

(60) Provisional application No. 60/990,123, filed on Nov. 26, 2007, provisional application No. 60/990,166, filed on Nov. 26, 2007, provisional application No. 60/991,010, filed on Nov. 29, 2007.

(51) Int. Cl.
*G06F 7/00* (2006.01)
(52) U.S. Cl.
USPC .......................... 707/737; 707/738; 707/739
(58) Field of Classification Search ................. 707/737, 707/738, 739
See application file for complete search history.

*Primary Examiner* — Mariela Reyes
(74) *Attorney, Agent, or Firm* — Cygnet IP Law, P.A.; Stephen A. Aycock, II

(57) ABSTRACT

Systems and methods for categorizing lexical data, accurately describing the structure of hierarchical data, accommodating lexicons having disparate data structures, pooling data from separate lexicons into aggregate lists, gathering data from participating users, and specified interfaces for handwriting recognition, optical character recognition, and text-to-speech and speech-to-text conversion are described. Some implementations can include a linguistic services center that interfaces with various natural language processing modules such that users of one module can take advantage of linguistic information provided in the system.

17 Claims, 17 Drawing Sheets

102

```
RADICAL SECTION {
        radical number (U)
        radical form (U)
        STROKE SECTION (M)
}

STROKE SECTION {
        residual stroke count (U)
        CHARACTER (M)
}

CHARACTER {
        character number (U)
        reading (U)
        character orthograph (U)
        character alternate orthograph (U)
        CHARACTER MEANING (M)
}

CHARACTER MEANING {
        mng number (U)
        mng text (U)
        COMPOUND (M)
}

COMPOUND {
        orthographic realization (U)
        compound reading (U)
        compound meaning (U)
}
```

(1) RADSXN
U: radNum < data type > < format tag >
U: radForm < data type > < format tag >
M: strokeSxn < STKSXN > < format tag >

(2) STKSXN
U: numResidualStks
M: character <CHARACTER > <format tag>

(3) CHARACTER
U: charNum < data type > <format tag >
U: reading < data type > < format tag >
U: charOrtho < data type > < format tag >
U: charAltOrtho < data type > < format tag >
M: mng < MEANING > < format tag >

(4) MEANING
U: mngNum < data type > < format tag >
U: text < data type > < format tag >
M: cmpd < data type > < format tag >

(5) COMPOUND
U: cmpdOrtho < data type > < format tag >
U: cmpdRdg < data type > < format tag >
U: cmpdMng < data type > < format tag >

種 zhông
type, kind, variety

|   | a | b | c | d | e | f | g | h | i | j | k |
|---|---|---|---|---|---|---|---|---|---|---|---|
| 1. | 名 | 佲 | 洺 | 茗 | 略 | 銘 | 酩 | | | | |
| 2. | 明 | 盟 | | | | | | | | | |
| 3. | 冥 | 鄍 | 暝 | 溟 | 嫇 | 煝 | 槟 | 莫 | 覭 | 螟 | 瞑 |
| 4. | 朙 | | | | | | | | | | |
| 6. | 鳴 | | | | | | | | | | |

| WORD | FULL | PARTIAL 1 | PARTIAL 2 | ABSENT |
|---|---|---|---|---|
| 师爷 | shīyé | shiye | shîye | shiye |
| 失业 | shīyè | shiye | shîye | shiye |
| 实业 | shíyè | shiye | shîye | shiye |
| 始业 | shǐyè | shiye | shîye | shiye |
| 视野 | shìyě | shiye | shîye | shiye |
| 事业 | shìyè | shiye | shîye | shiye |

| | |
|---|---|
| Encodings | |
| Japanese | ● shift JIS<br>○ Unicode |
| Korean | ● EUC-KR<br>○ Unicode |
| Simplified Chinese | ● GuoBial<br>○ Unicode |
| Traditional Chinese | ● Big 5<br>○ Unicode |

FIG. 5B

MODULAR SYSTEM AND METHOD FOR MANAGING CHINESE, JAPANESE AND KOREAN LINGUISTIC DATA IN ELECTRONIC FORM

RELATED APPLICATIONS

This application claims the benefit of: U.S. Provisional Application No. 60/990,123, filed Nov. 26, 2007 and entitled "Method, Apparatus and Software For Classifying Chinese-Type Characters and Character Components to Facilitate Classification, Search and Retrieval"; U.S. Provisional Application No. 60/990,166, filed Nov. 26, 2007 and entitled "Modular Approach to Managing Chinese, Japanese, and Korean Linguistic Data in Electronic Contexts"; and U.S. Provisional Application No. 60/991,010, filed Nov. 29, 2007 and entitled "Method, Apparatus and Software for Classifying Chinese-Type Characters and Character Components to Facilitate Classification, Search and Retrieval", each of which is incorporated herein by reference in its entirety.

FIELD OF THE INVENTION

Exemplary embodiments of the present invention relate generally to a method and apparatus for enhancing linguistic functionality on computers and in other electronic contexts, and in particular to a system and method for managing Chinese, Japanese, and Korean linguistic data in an electronic form.

BACKGROUND

Chinese, Japanese, and Korean (CJK) writing systems each employ large numbers of characters that are either of Chinese origin or that mimic Chinese characters in appearance. For this reason, various strategies have been devised to enable Chinese-type characters to be input into a computer (or looked up) using a keyboard having a limited number of keys. Such conventional input means are typically referred to as input methods. Input methods have been designed for a variety of input devices, such as keyboards, graphic tablets with styluses, and numeric keypads.

The operation of keyboard-based input methods for inputting a target character is typically based on one of three main principles: 1) typing a sequence of keys corresponding to shapes that the target character contains; 2) typing a sequence of keys corresponding to the sound of the target character or word; or 3) typing a sequence of keys corresponding to the strokes that constitute the basic form of the target character. Once the sequence of keys has been typed, a list of candidate characters or words is typically displayed, such as in a text application (e.g., word processor or electronic dictionary) or in a floating input window. A user can then select a desired candidate character or word, usually by typing a number corresponding to the candidate desired, and the character or word becomes part of the text being written. Sometimes, morphological or syntactic information is used by conventional systems in an attempt to reduce the candidate list or to "guess" the intended word.

Alternative forms of input include optical character recognition, in which text on a printed page is scanned in and automatically interpreted; handwriting recognition, in which an input stylus is used to draw characters by hand, at which point recognition software automatically interprets the handwritten strokes and converts them into characters; and speech-to-text conversion, in which spoken audio data is converted to text. It is also possible to convert text to speech using the appropriate software.

Although advances have been made in keeping with the development of new input technologies, a large number of deficiencies may still remain. One or more embodiments of the present invention were conceived in light of deficiencies, problems and limitations in conventional input methods and in other linguistic services, as described below.

Electronic dictionaries and input methods generally do not give the user control over the data sources that store the lexicon of words employed. The resulting dearth of lexical data can make it difficult to find or enter proper names and technical terms, for example. Place names, proper names, and technical terms are frequently absent from such lexicons and can often prove frustrating to input.

The lexical data sources used for input methods and electronic dictionaries are generally very limited and usually predetermined by the vendor. With conventional systems or input methods it may not be possible to combine data sources from different vendors, nor is it possible to select the kind of data that will be displayed during input. Also, conventional systems may not accommodate lexical data sources having different data structures. Entries are typically displayed verbatim as a monolithic text block as contained in the original dictionary that the electronic dictionary or input method is linked to.

Conventional lexical service systems may also lack modularity. Specifically, conventional systems may not readily enable one to access or link to third party linguistic services of a different kind. Thus, there may be no connection, for example, between input methods and dictionaries, or between speech-to-text modules and input methods.

Conventional systems and methods may provide little or no easy means to quickly check the correctness of a character during input. Some conventional programs do indicate characters or words that are prone to confusion, but the highlighted words are pre-marked. One may not be free to easily access a character or word dictionary of one's choosing, nor is it easy to switch from one lexical source to the other to obtain different data.

Conventional systems generally permit character search by radical or phonetic pronunciation. Searching characters this way can be cumbersome. Viable alternatives to conventional character lookup systems and methods are discussed in a co-pending patent application entitled "System and Method For Classification and Retrieval of Chinese-Type Characters and Character Components" filed by Warren Daniel Child on the same date as the present application and which is referred herein to as the "character lookup application", and which is incorporated herein by reference in its entirety.

Conventional systems and methods may provide little or no way to easily distinguish input candidates by word type. When faced with many homonymous word candidates, a user may typically be required to look through a long list of candidates to pick the target word he or she wants. There may be no way to readily distinguish dissimilar words, as between different types of nouns (common or proper) or different parts of speech, even though doing so would be a great aid to the user in choosing the word desired.

New word (user word) registration functions in conventional systems or software are generally deficient. Some systems may nominally provide users with the ability to register their own words. The process can often be tedious, however, and the user is typically required to manually enter words on their own, with little or no help from the system.

Conventional systems and methods typically provide insufficient control over automatic parsing and registration functions. Although some systems identify novel character combinations not included in their dictionaries, they generally do not distinguish words from phrases and do not enable the user to edit the final registration entry. As a result, tedious false candidates may begin to clutter the system, hampering ease of text input.

Conventional systems and methods provide little or no flexibility in degree of tone marking during search and input. Foreign users of Chinese input methods often struggle with search and input because they may be uncertain of a word or character's tone; even native speakers can have trouble because of dialectical differences in tone realization. Never using tones, however, has the problem of often generating too many candidates. For example, U.S. Pat. No. 5,594,642 appears to describe an input method framework that would permit tone or toneless input, but does not appear to describe how to accomplish this, suggesting that developers handle the issue. Further, the specification of U.S. Pat. No. 5,594,642 does not appear to provide a mapping to the often useful approach of using partial tone designation as disclosed in one or more embodiments of the present invention.

Conventional systems and methods may provide little or no control over the encoding employed. Also, conventional systems and methods may provide little or no ability to access lexical data in contexts other than the original one intended. Thus, for example, input methods and dictionaries cannot be used to mouse-over a word on the screen and obtain lexical information about it. As a result, while a significant quantity of data may be stored in a conventional system, it cannot be readily accessed to find out information about words already entered into text. This lack of accessibility can be a waste of potential resources.

Conventional systems and methods may not provide coherent interfaces so that external natural language processing (NLP) systems can share lexical data. Consequently, handwriting recognition, optical character recognition, speech-to-text conversion, text-to-speech conversion, and keyboard input conventionally all tend to operate as separate systems, and each tend to have their own data stores. Also, in contrast to embodiments described herein, conventional systems and methods may not provide a system for revenue sharing between an OS developer, lexical data providers, and an (input method) IM developer to cooperate and share jointly in revenue generated by implementing a synthesized system enabling the modular incorporation of various forms of lexical data from different sources. Furthermore, conventional systems and methods may not provide a level of data security that would be necessary or desirable to implement a revenue sharing system, as described above.

SUMMARY

Embodiments can accommodate both simple and complex data structures; provide enhanced data connectivity, integration and accessibility; prevent data theft; help incorporate new words and phrases into lexical data sources; and enhance text input functionality. Furthermore, when implemented as a linguistic services center, embodiments can interface with various third-party natural language processing modules providing optical character recognition, handwriting recognition, speech-to-text conversion, text-to-speech conversion, and the like. A revenue sharing and data security embodiment can make it possible to encourage lexical data providers and linguistic service module developers to make their lexical data and service modules available to the system in a way that lexical data providers, module developers, the OS provider, the LSC provider, and the user may all mutually benefit. An embodiment can also provide enhanced text input functionality.

One or more embodiments provide means for marking lexical data categories, means for modeling lexicons having disparate data structures, means for pooling data from the separate lexicons into aggregate collections, means for preparing, importing and internally structuring disparate data sources intelligently for the purposes of integration, means to gather data from participating users, and specified interfaces for handwriting recognition, optical character recognition, keyboard input, and text-to-speech and speech-to-text conversion. One or more embodiments are also able to incorporate both complex and simple lexical data structures, integrate such disparate data sources in an intelligent fashion, provide enhanced accessibility to such data, improve data presentation, and enhance input functionality. The input means may be coupled with an electronic implementation of the character lookup invention by the same inventor to facilitate the lookup of individual characters. One or more embodiments can comprise a linguistic services center that interfaces with various natural language processing modules such that users of one module can take advantage of the wealth of linguistic information provided in the system. The resulting system greatly minimizes the frustration and inconvenience users typically experience when using Japanese, Chinese, or Korean in electronic contexts.

BRIEF DESCRIPTION OF THE DRAWINGS

FIG. 1A shows an example of hierarchical modeling of lexical data;

FIG. 1B shows how format tags can be applied to the model described in FIG. 1A such that raw data from a publisher can be prepared for incorporation into an embodiment;

FIG. 3D shows an exemplary presentation of character data during a mouse-over;

FIG. 3E shows an exemplary grouping of lists of homonyms according to a classifying feature such as radical or core component;

FIG. 5A shows an exemplary pinyin entry of a word and differing associated degrees of tonal specificity for a word spelling in Chinese, thus making it possible for tonal data to have "shadow" fields that represent the various possibilities;

FIG. 5B shows an exemplary operation panel for designating the type of encoding to be used;

DETAILED DESCRIPTION

Platform and Implementation

Figure 2A:
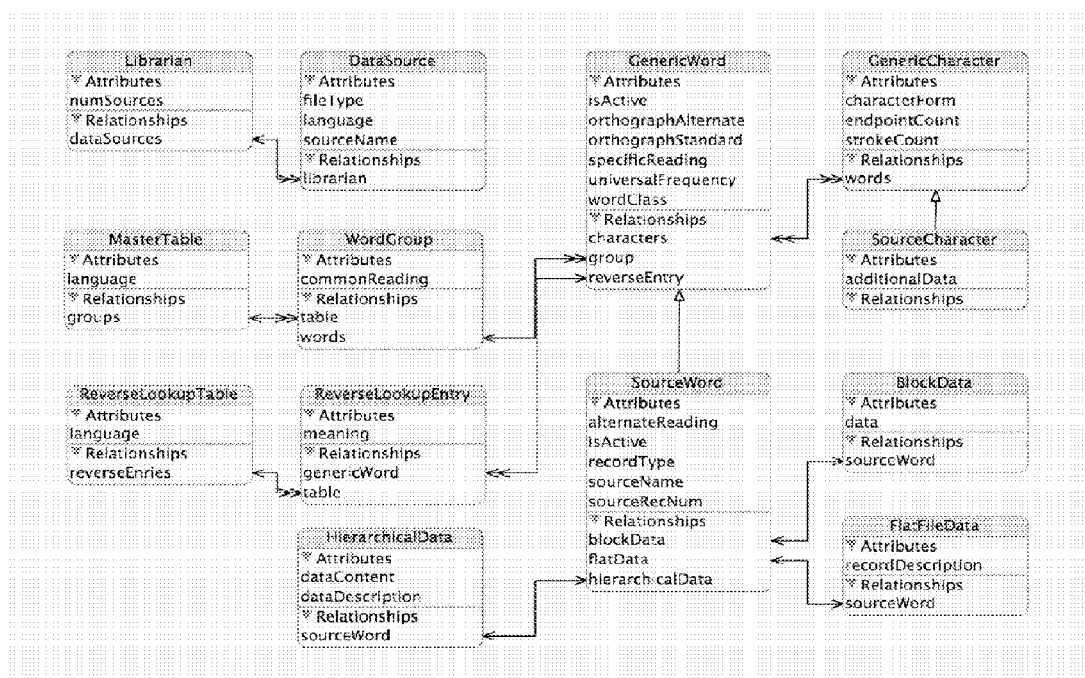
FIG. 2A shows an exemplary data structure.

Embodiments can be implemented on a variety of platforms and operating systems. An exact manner of implementation or coding can depend on a number of factors including the software development language and API being used, if any. For example, as of the time of this writing, if implementing an embodiment on Mac OS X, it may be preferable to use a combination of C and Objective-C together with elements from the Carbon and Cocoa APIs. On other platforms, other languages might be preferable and other APIs may be used. By using platform-independent languages such as Java, is may also be possible, using largely the same code, to implement an embodiment so that it works on more than one platform. Implementation details, to the extent they are not needed to explain embodiments, have been omitted as one skilled in the art of programming for the platform in question, using an appropriate language and API, could implement an embodiment in a variety of ways. Therefore, the descriptions below focus on describing and illustrating the functions and features of exemplary embodiments. One skilled in the relevant art may implement an embodiment in the context of particular platform and operating system constraints. The software code itself, which is often platform-specific, is not represented here, but rather here are presented the architecture and design details to explain, describe and illustrate exemplary embodiments.

Various embodiments are described below with reference to FIGS. 1-6. The first five embodiments described below represent features including: 1) the ability to incorporate simple and complex lexical data sources; 2) enhanced data integration and accessibility; 3) improved data presentation; 4) enhancement of data content; and 5) improved input functionality. Another embodiment combines all the functions and features of the previous embodiments into a linguistic services center that interfaces with external natural language processing modules. Another embodiment includes revenue sharing, data security features, and lexical data architecture to be employed in conjunction with other embodiments so as to make a system or method commercially attractive. Yet another embodiment provides an implementation of the linguistic services center oriented to non-CJK (Chinese Japanese Korean) languages.

It will be appreciated that the various embodiments have been presented and described separately for clarity. Preferably, all of the features are combined in one system, as described below. It should be appreciated that these embodiments are described to facilitate understanding and are not intended to represent every embodiment or combination of embodiments.

The operation of an embodiment depends on a number of factors including how many of the possible linguistic service modules are incorporated into the system. For example, one would expect a basic functionality to include a capability for looking up words and characters, as is the case with electronic dictionaries. Additionally, it is likely that an input method would be incorporated into the system. Common to both of these basic linguistic services are the functions of search and retrieval.

For languages like Korean and Japanese, the typical approach to initiating a search is to input sequences of letters that correspond to the sound of the word or character, and to then, at appropriate times, hit the spacebar to present candidate words. For Chinese, professional typists may alternatively employ specialized input methods based on character shape. However, because such methods require much training, the majority of users use phonetic-based input methods having the same underlying principle as those used for Japanese and Korean. Embodiments may make it easier to input text phonetically, and for that reason, it matters little whether in Chinese the user opts to input via pinyin or Bopomofo key input. Either approach can be accommodated by the linguistic services center.

Types of Lexical Data Structures

A major limitation of many conventional input methods and other linguistic services provided on computers is a dearth of available data and lack of control over what sources of data are used. Accordingly, an embodiment establishes the ability to accommodate a wide variety of lexical data sources from different providers and having different data structures. For the purposes of this description, data sources may be classified in two ways: simple (flat) and complex (hierarchical). Simple (or "flat") data structures have a fixed number of regular fields per record. By contrast, complex (or "hierarchical") data structures exhibit variety from one record to the next, with elements within each record repeating an irregular number of times.

A minimal configuration for use in a text input method would be two key fields, one of which would contain the orthographic word (the word the way it is written in the native language) and the other of which would contain a corresponding phonetic or phonological rendering of the word using some form of romanization or other spelling system. This would represent an example of a basic flat data configuration.

A basic "block" data configuration could contain these two minimal key fields with the addition of a text block containing supplementary lexical information as one might find in a dictionary. Differentiated data sources would contain the two minimal key fields with additional lexical information that has been parsed by information category (see below). Moreover, complex data sources would exhibit the kind of complexity found in printed dictionaries. An embodiment can accommodate all manner of data sources, whether simple or complex, flat or hierarchical.

Lexical Data Categories and Category Marking Means

The data contained in a typical dictionary can be quite varied for each entry. Each entry can manifest one or more word classes (parts of speech), one or more definitions, core meanings and sub-meanings, etymological information, pronunciation guidance, and the like. Thus, the nature of the data does not readily lend itself to incorporation in a standard flat file. By contrast, the data usually prepared for electronic contexts tends to be quite restricted, taking the shape of a basic flat data structure, or rigid adherence to a quasi-hierarchical structure with perfectly regular repeating patterns. To be able to handle any number of data structures, however, it is necessary to be able to classify the kinds of information that one expects to find in the data structure. Accordingly, Table 1 lists categories of information commonly found in CJK character dictionaries, and Table 2 lists categories of information commonly provided in CJK monolingual and bilingual word dictionaries. Both tables include an accompanying abbreviated code for each category, the purpose of which is described presently, together with an indication of whether each category is likely to have multiple (M) or unary (U) instances of that category.

TABLE 1

Sample Categories of Character Data

| Concept | Code | MS | Usage Description |
|---|---|---|---|
| character heading | CH | U | indicates a main heading for a character (in Chinese or Japanese character dictionaries) |
| alternate form | ALT-CH (e.g. SIMP-FORM TRAD-FORM) | M | alternate forms of the character (frequently used to distinguish traditional and simplified, though on rare occasions there are more than one alternate forms). Alternate designations may be used such as SIMP-FORM or TRAD-FORM depending on the particular dictionary in question. |
| stroke chart | STK-CHT | U | a stroke chart showing how the character is written |
| number of strokes | NUM-STKS | U | an indication of the number of strokes |
| radical | RAD | U | the radical by which the character is traditionally associated |
| frequency | FREQ | U | the frequency ranking of the character |
| core component | CC | U | the core component by which the character is associated according to the method disclosed in the character lookup application |
| recurring element | RE | M | any recurring element used to compose the character, whether simplex or complex (see character lookup application) |
| etymology | ETYM | U | etymological information about the character |
| phonological development | PHON-DEV | U | data about the historical phonological development of the character |
| character reading (generic) | CRDG | M | rendering of the character's pronunciation without specification of type of reading |
| character reading (type specific) | CRDG-TS (e.g. CRDG-BPMF CRDG-PY CRDG-KUN CRDG-ON) | M | rendering of the character's pronunciation with evidence of the type of reading (e.g. kun vs. on for Japanese, dialectal specification for Chinese, together with spelling system (e.g. Bopomofo vs. pinyin) |
| character meaning | CMNG | M | one of the character's meanings (in same language) |
| number of endpoints | NUMPTS | M | an indication of the number of endpoints, as reckoned using the method disclosed in the character lookup application/multiple values assumed on the grounds that alternate values may be provided (see character lookup application) |
| associated vocabulary | V | M | words that use the character (each vocabulary entry can be modeled as in Table 2 below, though usually in character dictionaries the vocabulary is given in a simpler format |

TABLE 2

Sample Modeling of Word Data

| Concept | Code | MS | Usage Description |
|---|---|---|---|
| orthograph | ORTHO | U | indicates the word the way it is reading in the native orthography (for CJK languages, usually some combination of characters; in Japanese, characters or kana or both; in Hangul, hanja or hangul or both) |

TABLE 2-continued

Sample Modeling of Word Data

| Concept | Code | MS | Usage Description |
|---|---|---|---|
| alternate orthograph | ALT-ORTHO | M | an alternative way of writing the orthograph (a fairly common phenomenon) |
| reading | RDG | U | indicates the phonological rendering of the word |
| alternate reading | ALT-RDG | U | indicates an alternate phonological rendering of the word (useful, for instance, if both bopomofo and pinyin shown) |
| part of speech | POS | M | indicates that what follows is a part of speech |
| core meaning | CORE-MNG | M | meaning categories are groups of meanings considered related, and are commonly used in bilingual dictionaries |
| synonym | SYN | M | a synonym |
| definition | DEF | M/U | a definition of the lexeme |
| sample sentence | SS | M/U | a sample sentence |
| noun type | NT | M | type of noun (proper, count, mass, dual) |
| verb type | VT | M/U | the type of verb (meaning of this entry will differ depending on the language) |
| adjective type | AT | U | type of adjective (meaningful in Japanese, for instance) |
| constituent characters | CON-CHARS | M | characters used to compose the word (can be modeled as in Table 1, though usually so much detail is not necessary) |
| translation language | L2-LANG | M/U | the language into which a word is translated; for bilingual dictionaries, unary (U); for multi-lingual dictionaries, multi (M) |
| translation equivalent | L2-EQUIV | M | a second language word considered equivalent to the first |
| translation definition | L2-DEF | M | a second language definition of the word |

Data prepared for incorporation into the linguistic services center may employ the category marking means described above. In other words, using the above codes as "tags" for each data element, it is possible to accurately describe the category of data represented for each unit of data.

Data Structure Marking

Because complex lexical data structures cannot be readily incorporated into flat files, the present embodiment provides a data structure marking means for describing complex data structures. This data structure marking means enables the embodiment to incorporate a wide variety of data from different dictionaries and lexical data sources, such that they may all be used simultaneously within, and integrated seamlessly into, the same linguistic services system.

According to the structure marking means, two basic data types are recognized: unary and multiple. Unary data (designated as "U") is any variable containing a unary value (the exact binary data type used in implementation being unimportant as it could be a string, integer, or other data type). Multiple data (designated as "M") is any entity that has more than one value (which can likewise be implemented using a variety of binary data types such as arrays, lists, sets, and so forth).

The model also recognizes that data may come in sets. A set is a pairing of two or more types of information that typically co-occur. For example, following the definition of a word it is common to have a sample sentence or phrase showing the word in context. In this case, the definition and sample sentence would constitute a set. Further, any data type may be marked as optional (as by using an asterisk in the header file (see below)). What is obligatory and what is optional naturally will depend on the dictionary in question.

Each level in the hierarchy can incorporate a number of separate items that are below it in the hierarchy. By way of illustration, FIG. 1A shows a diagram 102 of types of data in a hypothetical Chinese-English character dictionary. In FIG. 1A, sections are capitalized, and the fields within a section are enclosed in braces ({ }). Unary fields within a section are in lower case, and fields having multiple entries are capitalized, as they in turn constitute sections. In the example shown, the highest level in the hierarchy is a radical section, and the lowest is a character compound. Unary and multiple attributes are designated by "U" and "M", respectively.

Header Files and Parsing

In order for the linguistic services center to incorporate different data having varied and complex structures, a header file can be provided to describe the data structure used in the lexicon to be imported. FIG. 1B shows a sample header description 104 for the data of FIG. 1A. As shown, each level in the hierarchy is marked by a number indicating the level (1 is highest), followed by its member attributes enclosed in curly braces. Each member attribute is designated as being unary or multiple. In practice, an actual implementing data type (e.g. NSInteger for numbers, or NSString for text) could be specified. Further, a format tag would in practice be provided to show how that data category is marked in the original data source. In the figure, the implementing data type and format tag are not specified, as these would be very much platform dependent, and would also depend on how the data was originally stored. Moreover, both sections and member variables can be designated as optional (as by using an asterisk *). Sets, which indicate data types that routinely come in pairs or groups (such as definitions and corresponding sample sentences) can be marked by enclosing them in brackets or some other suitable means. (Sets are not shown in the figure).

Internally, each U and M data type is stored using an appropriate data structure, whether it be a string, integer, real number, binary large object, array of strings, binary tree, or the like. The embodiment's ability to interpret the data structure from the header file enables the data to be modeled internally in the system, and further allows the data to be parsed correctly upon import into the system.

Finally, an indication within the header can further indicate the lexical data source's overall data structure (simple/flat vs. complex/hierarchical). Likewise, the nature of the lexicon (thesaurus, bilingual dictionary, and the like) can also be indicated, together with indications as to the source and target languages. The exact signaling means used for such general information about the lexical data source can vary and still; be used with an embodiment, so long as it adheres to a pre-established form adhered to by all parties.

Data Preparation

To prepare the data for incorporation into an embodiment of the linguistic services center (LSC), lexical data can be "marked" so that the LSC system can interpret the data that it imports. This enables the LSC to keep lexical data properly parsed so that it knows what kind of data category is represented within each record. Taking, as an example, a simple "block" structure comprising orthographic word, reading, and undifferentiated information about the word, each lexical record would have the following conceptual structure:

a. key field 1 tag (reading)
b. key field 2 tag (word itself)
c. block data tag (everything else)

For differentiated data, many more field indicators may be marked using codes like those shown in the above table. Also, alternate codes could be used. That is, the exact code forms used can vary so long as they indicate which portion of a record is being referred to in an unambiguous manner.

Typically, a lexicon will be prepared by the lexicon provider or by the provider of the linguistic services center, depending on how financial arrangements are handled. A header file like that described above would typically be provided together with the data, with the data medium used depending very much on the lexicon provider.

Data Storage

Once a lexicon has been imported, the data will be interpreted using its header file description, and an appropriate data storage means will be updated or, if necessary, created to house the data. Suitable storage devices include mass storage devices (e.g., magnetic or optical disks), electronic memories (e.g., RAM, flash, etc.), or the like.

Figure 8:
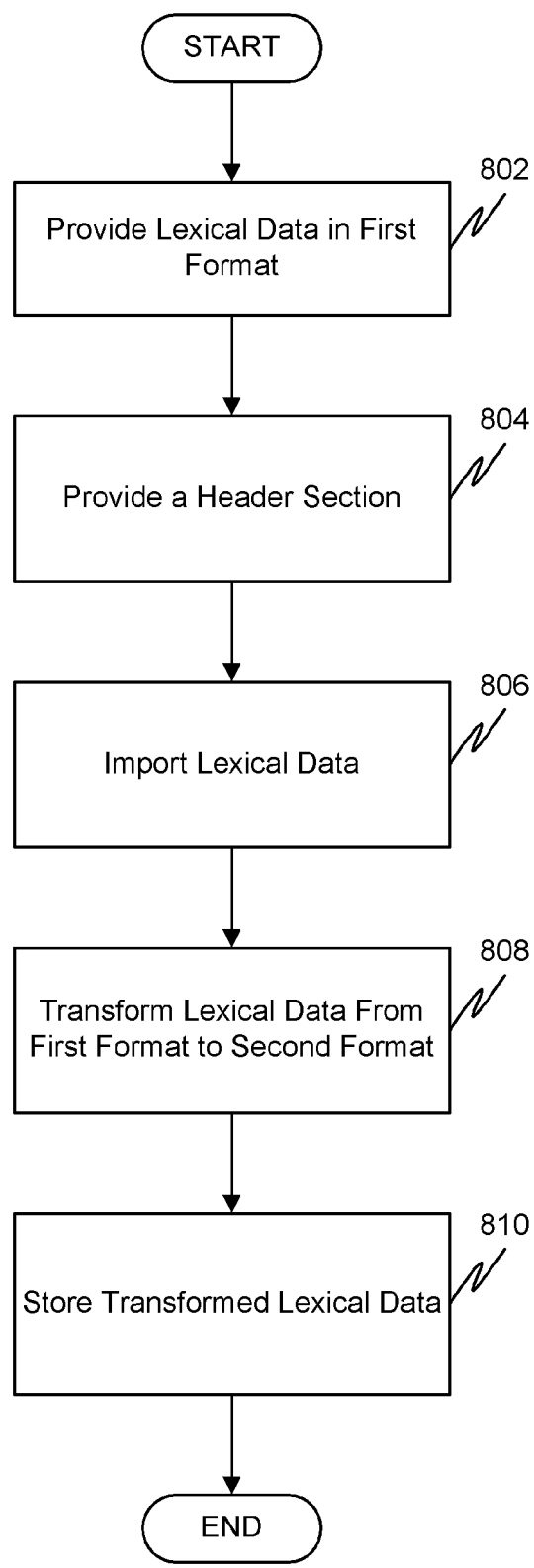
FIG. 8 is a flowchart of an exemplary method for preparing, importing and integrating lexical data.

FIG. 8 is a flowchart of an exemplary method for preparing, importing, and transforming lexical data for use with an embodiment (e.g., an LSC as described below). In FIG. 8, the method starts and processing continues to step 802. In step 802, lexical data is provided in a first format. The lexical data can include a plurality of records, with each record having a plurality of components. Each component corresponds to one of a plurality of lexical data types and each component is marked with a lexical marker code that corresponds to the lexical data type of that component. Processing then continues to step 804.

In step 804, a header section for the lexical data is provided. The header section included a reference to a data structure description having a plurality of data structure marker code values. Each data structure marker code value corresponds to one of the plurality of lexical marker codes, and the structure constitutes one of a simple/flat structure or complex/hierarchical structure. Processing continues to step 806.

In step 806, lexical data is imported. Processing continues to step 808.

In step 808, imported lexical data is transformed from the first format to the second format. The second format is different from the first format. The data is transformed by assigning to each component of the imported lexical data the data structure marker code value corresponding to the lexical marker code for that component, such that the lexical data type of each component can be recognized and the component can be stored according to its corresponding data structure marker code value. Processing continues to step 810.

In step 810, the transformed lexical data is stored for use by an LSC or other system. The data is stored in the second format. After step 810 processing ends. It will be appreciated that the steps shown in FIG. 8 may be repeated in whole or in part in order to accomplish a contemplated lexical data preparing, importing and transforming task.

Another embodiment, described with reference to FIGS. 2a-2b, may also include the features described above.

Global Control of Data Sources

FIG. 2A is a diagram showing an exemplary data structure 202. In the figure, each box like element constitutes a database entity. Each entity has attributes (equivalent to data fields) and relationships, which show the link to other entities.

As shown in FIG. 2A, a Librarian entity is provided to keep track of data sources at a global level. This entity minimally provides a relationship to a DataSource entity, meaning that it has a one-to-many relation to data sources. The DataSource entity provides basic information on the nature of the lexicon (monolingual dictionary, bilingual dictionary, thesaurus, etc.), including its file type (simple vs. complex), source language (Japanese, Korean, simplified Chinese, traditional Chinese, etc.), and target language (in the case of bilingual dictionaries). Additional information such as the field of specialization (medical, computer, etc.) may be provided additionally in a separate attribute.

Figure 2B:
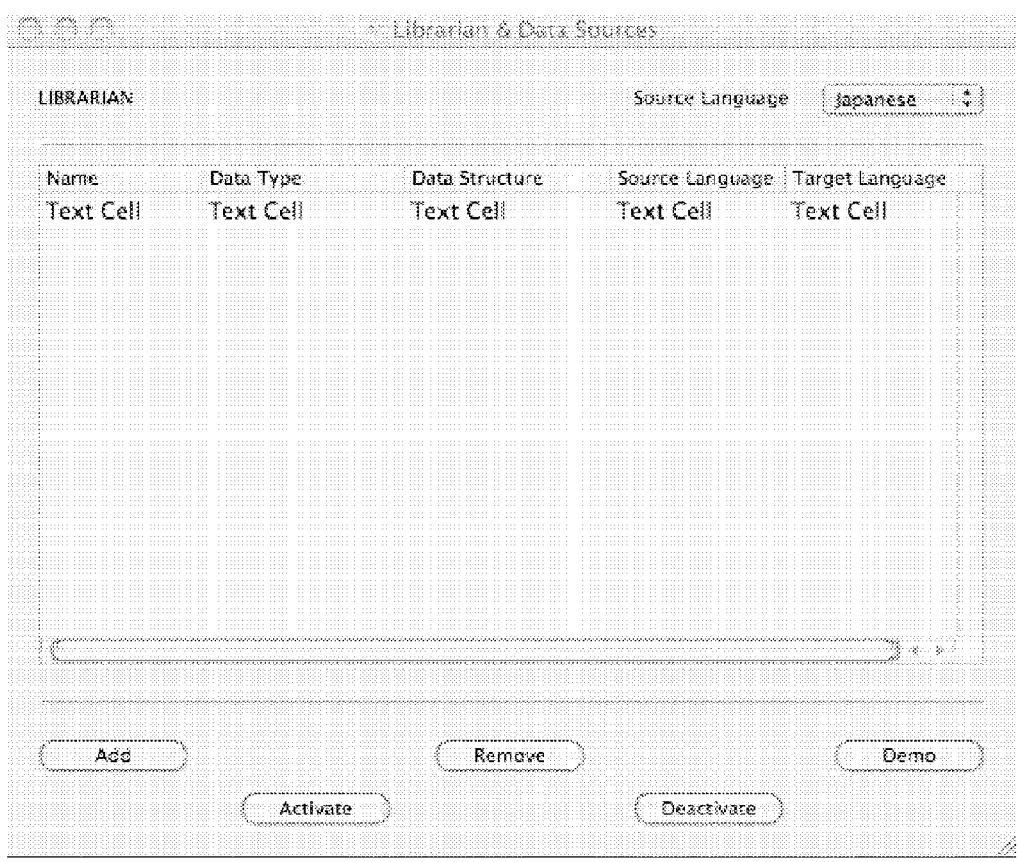
FIG. 2B shows an exemplary interface for permitting users to add, remove, activate, deactivate, and demo lexical data sources to, from, and within a lexical services center embodiment.

FIG. 2B shows an interface 204 that enables the user to add and delete lexical data sources to and from the system, as well as to activate, deactivate, and demo lexical data sources (see below on data source activation and deactivation). The interface contains GUI elements such as buttons, tables, scroll bars, and the like, all of which are commonplace in modern-day applications. To perform activation, for instance, one might highlight the row corresponding to the lexicon in question and press the activate button. A similar procedure would be used for deactivation and entering a demonstration mode. Additional GUI interfaces such as menu items could also be provided to achieve equivalent functionality.

All the internal processing required to perform the distribution of lexical data within the data model is, of course, implementation specific, depending on the OS platform, language chosen, and database technology employed. Such distribution or removal of data would, naturally, not be a concern for the user.

Multi-Tiered Data Objects

Data that is imported into the linguistic services center and parsed according to the header file and data category tags (lexical or data structure) described above is distributed into a variety of data objects that form part of a multi-tiered structure. At the top level of this structure is a MasterTable entity. Each master table instance, of which there is one for each language, relates to a collection of objects at the next level in the structure, namely WordGroup objects. The embodiment provides for a WordGroup entity because when inputting CJK languages from a keyboard, it is typical to input a reading which may correspond to a variety of homophonous or nearly homophonous orthographic realizations. The exactness of homophony represented by the WordGroup entity is negotiable depending on the language and degree of accuracy desired, but, for instance, might typically be toneless pinyin for Chinese, or a standard hiragana rendering for Japanese. In FIG. 2B, the shared homophony of the word group is represented by the attribute commonReading.

Naturally, the next level below the word group is a word. Because a large volume of lexical data from a variety of lexical data sources is going to be used, one can expect a great deal of overlap among the lexical data sources in terms of the words represented. For this reason, rather than recreating overlapping records containing many identical key fields, a GenericWord entity is provided. This entity contains basic word data shared regardless of lexical data source, and is to be distinguished from the next level down, a SourceWord entity, which contains data unique to a particular lexical source.

GenericWord records can contain a variety of attributes, including a Boolean to indicate whether the word is active in the system, one or more orthographic realizations, some indication of the word class of the entity (word class being a specific code to identify the syntactic or other behavior of the word), the word's exact reading, and various frequency data that may be helpful for presenting words as candidates in an input method. Note that the specific reading is a reading that specifies more exactly the way the word is pronounced or spelled using a phonetic system. For instance, in the case of Chinese, this attribute would be represented by tonal pinyin, bopomofo, or the like.

In the figure, a SourceWord entity is provided as a child entity of its parent, GenericWord. Although other data models could be realized while keeping with the notion of integration and hierarchical modeling, this approach will be used for illustrative purposes. Recalling that lexical data sources can contain a variety of data types (simple/flat vs. complex/hierarchical), one attribute of a SourceWord record is an indication of the type of record it represents. Thus, lexical data sources containing simple or flat data structures will so indicate in this field, whereas those containing complex or hierarchical data will indicate this here.

Finally, depending on the type of lexical data source from which SourceWord data originates, additional information would be stored in some form of data structure depending on the structure specified. A variety of implementations are possible depending on the platform, programming language, and other technologies being used.

Protection Against Data Theft

Ideally, a security feature is provided to prevent downloading or exporting of the internally stored data, thereby protecting the copyright (or other intellectual property rights) of the individual data source contributors. Such a system encourages third party linguistic data source developers to provide compatible linguistic data sources without fear that their materials might be copied or stolen. It also prevents users from trying to steal data from individual lexical data source contributors, or trying to create their own data source based on the works of other parties. This security feature may address reluctance of some linguistic software providers to pool data together.

Character Lookup

An embodiment may also provide a means to keep track of the constituent characters for each word. To this end, a GenericCharacter entity is provided. This entity has a many-to-many relationship with Generic Word. A variety of detailed and not-so-detailed configurations can be established here, but in the example shown, GenericCharacter entity has attributes for stroke count, endpoint count (see Character Lookup Invention), and of course the character form (orthograph) itself. Additional data can be provided in that entity or in additional entities, based, for instance, on a Source Character entity (see FIG. 2A). Such an entity employs a parallel concept to that of SourceWord; namely, it could be used to store lexical data about the character particular to a particular data source. Although not shown, bilingual and even multilingual data can be associated with the character data in the same manner that alternate language data is associated with GenericWord instances (see Reverse Lookup below).

By connecting words and their constituent characters to the data provided in the character classification and character lookup invention, the user is able to access a wealth of data not usually readily available in such systems. Such links can be accomplished using a data structure like that provided in FIG. 2E. Linking lexical data with the character lookup invention has the obvious advantage of providing yet another means to access words, only this time through individual characters. It means that using the many lookup features provided in the character lookup invention one can find words associated with a particular character. The user may even be allowed to choose the key that is used for activating the lookup function, as shown in the preferences panel GUI shown in FIG. 3F.

Note, also, that while not shown in the figure, it is also possible to include stroke-based input data with characters. In this way, input methods based on stroke shapes may also be employed within the overall Linguistic Services Center.

From an operational standpoint, a shortcut key or other rapid access means may be set, thereby offering access to the type of highly efficient and functional lookup method and apparatus described in an embodiment of the character lookup invention. To search character information or to locate a difficult or rare character, if the character lookup invention embodiment is associated with an embodiment, then a sequence of shortcut keys or a menu item can trigger a palette that enables the user to look up a character using any of the means described in said character lookup invention embodiment, including but not limited to search by radical, by non-radical element, by radicals and non-radicals in combination, and by stroke and endpoint count.

Reverse Lookup From an Alternate Language

One feature of the linguistic services provided by the present embodiment is that it enables a user to look up a word from other than the target language. Thus, for instance, an implementation targeting simplified Chinese may allow users to input an English word and thereby retrieve candidate Chinese words. To realize this function, a ReverseLookupEntry entity is provided with a single attribute, meaning. This entity has a many-to-one relationship to the GenericWord entity. Such reverse lookup entries are, naturally, associated with a specific language, and are therefore collected in a ReverseLookupTable instance that contains a collection of reverseEntries (see FIG. 2A). Therefore, one system can accommodate a variety of languages both for input and for reverse lookup, and all reverse lookup entries for any given alternate language are collected in one collection. A GUI can permit the user to switch from standard search or input mode to a mode designed for searching or inputting target words via an alternate language.

Morphological Analysis

Typically, many linguistic service modules, such as input methods and text-to-speech or speech-to-text converters, incorporate some degree of morphological analysis. The reason for this is that if merely given citation forms for words, the linguistic service module would not recognize the host of inflectional variations to which citation forms are altered. Theoretically, at least two approaches can be taken to morphological analysis: additive and subtractive.

In an additive approach, all citation forms are cited together with their inflectional paradigm (the different ways the word can be inflected). For instance, in Japanese, every verb would be listed together with the various inflectional endings it could take. Pronouns would be listed together with the commonly occurring case particles or postpositions. Any noun would be listed together with itself involving a postposition. While this method may appear straightforward, it poses a considerable strain on retrieval speed, as a base lexicon of, say, 250,000 words could easily balloon into the millions using this approach. For matching, input text would be checked against the list of inflected words generated by the additive method. This method is theoretically possible but unlikely to be practicable because of the huge size of the resulting vocabulary table.

By contrast, in a subtractive approach, derivational rules are used to recognize inflections and derivations of the various word classes, determine their stems, and trace back to their citation form. Again using the case of Japanese, ご and お would be recognized as potentially standing for honorary prefixes for nouns, and various verbal inflections like た、る、ます、and て etc would be recognized potential suffixes. That being the case, potential citation forms would be identified by removing potential affixes from the input typed in, identifying the stem, and converting from stem to citation form. The derived citation form would then be checked against the collection of active words (GenericWord instances that have their inactive Boolean set to TRUE or YES). When matches having the same word class are found in the collection of active words, then those matches are converted back to the inflected form. A similar example of morphological processing in Chinese would be the ability to recognize which type of words expect to be followed by de meaning "of" (possessive) 的 ), and which expect de indicating a resultative complement ( 得 ).

In the present embodiment, provided that sufficient grammatical information is associated with the lexicons used, either morphological approach—additive or subtractive— can in principle be applied to the embodiment to enable input from a user to be correlated to lexemes collected in the embodiment. The grammatical information in question can take two forms: identification of the one or more word classes to which each lexeme belongs, and derivational rules that show the derivations that can be formed from the word stem. In the case of the additive approach, an additional table deriving from the internally stored collection of lexemes can be generated whereby derived forms are generated based on citation forms and word class codes and a set of grammatical derivational rules. In the case of the subtractive approach, a set of grammatical rules can be applied to parse potential affixes from the text input by the user. Potential citation forms can be identified, and the affixes are thereupon added back onto the base in an appropriate manner prior to displaying the words as candidates.

For convenience, this functionality of morphological analysis (MA) can be thought of as consisting of three separate entities: a morphological parser (MP), which isolates morphemes from an input string, a morphological generator (MG), which adds inflections back onto a stem, and a set of derivational rules (DR), which describe the kinds of inflections that can be added to words of a certain class. See, FIG. 6.

Morphological analysis may not be a feature the user has to actively think about. Word candidates can be simply presented as a function of the additive or subtractive application of morphology to derive citation forms from the collection of lexemes in the system, and to then present inflected candidates in the list of candidates from which the user chooses the target word. It should be pointed out that because this capability is provided in a modular function, it applies equally well whether the user is using the system to input words of text or to lookup an word in a dictionary based on its inflected form.

Parsing of Multiword Input

An embodiment may incorporate a feature to recognize cases where the user has input phonetic characters corresponding to more than one word. When the user inputs the equivalent of more than one word, then the system is required to parse the input to attempt to search for the constituent words. (Actually, to be precise, when we say "word" here we mean a lexeme, that is, a lexical entity viewed as one unit. For instance, phrases and idioms (such as Chinese chengyu) are sometimes treated as a single unit.) As in the case of standard morphological analysis, both additive and subtractive approaches are theoretically possible, though from the standpoint of data storage efficiency, a subtractive approach is probably preferable.

Thus, when the user inputs a string of characters corresponding to some target text, a search is initiated to match the input to words in the language. If an exact word match is not found via a standard search based on the reading contained in said input text, and if a match is also not found via the subtraction of morphemes, then searches can be made for substrings of the input characters to see if those match combinations of citation forms or citation forms with morphological inflection. Because this step is more time-consuming, it may be best performed after first trying the less expensive steps of morphological analysis described above.

Like morphological analysis, multiword recognition may not be something the user actively thinks about, but rather a feature that simply "happens" during input or search. If the user inputs a phonetic sequence equivalent to two or more words, then the multiword recognition feature enables the input method to identify candidates for each word in turn. The process is one wherein if the initial search does not identify a match to the entire input sequence, then a search is conducted on substrings of the input sequence.

Color-Coding By Lexicon

Another embodiment can incorporate any combination of features described above along with the features described below. The embodiment can enable the user to color code the lexical data sources, such that candidate words data during search or input are color-coded according to the lexical source from which their source data derives. This can enable the user to rapidly recognize the correct candidate by its source. Such a function is particularly useful when, for instance, the user is using specialized dictionaries containing words whose homonyms would be readily distinguished from the target technical word by the source lexicon. Likewise, if a source contained only proper nouns, they would be readily identified as such when they appeared in the candidate window.

Figure 3A:
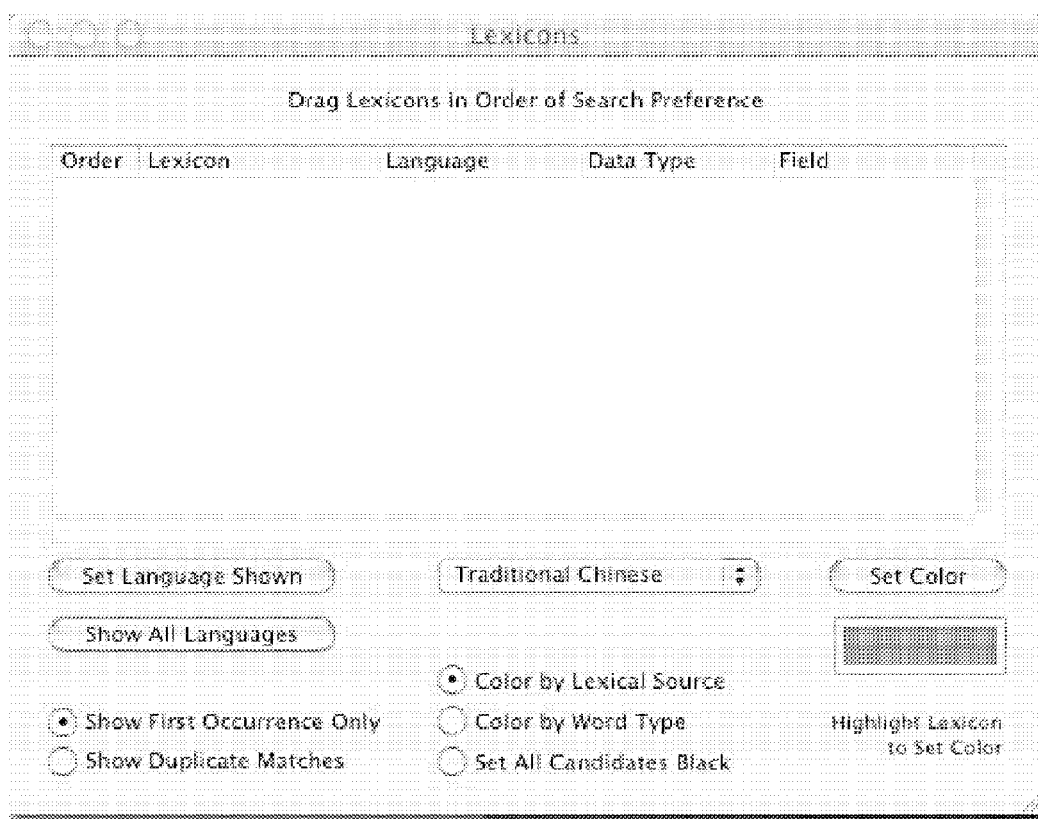
FIG. 3A shows an exemplary human-computer graphical user interface for permitting a user to designate the color in which lexemes from data from the lexicons will be displayed in the input candidate window, and indicate whether to have duplicate matches from different data sources displayed in the input window.

To make these functions available, a separate window or panel 302 can serve as a means to associate colors with each of the lexical data sources associated with the language in question (FIG. 3A). For instance, by default, a general lexicon might be color-coded black, and the user would most likely choose other colors for specialized or field-specific lexicons. Such specialized fields could include medicine, computer science, biology, linguistics, and/or the like, said possible fields being essentially unrestricted and infinite, in principle. Comparison of search results for different lexical sources is facilitated by the use of color-coding in this manner. To associate a color with a particular linguistic data source, one uses a selects the data source in question and uses a color selection means to associate a color with it. FIG. 3A shows an interface that provides such a selection means.

Color-Coding by Word Class

Figure 3B:
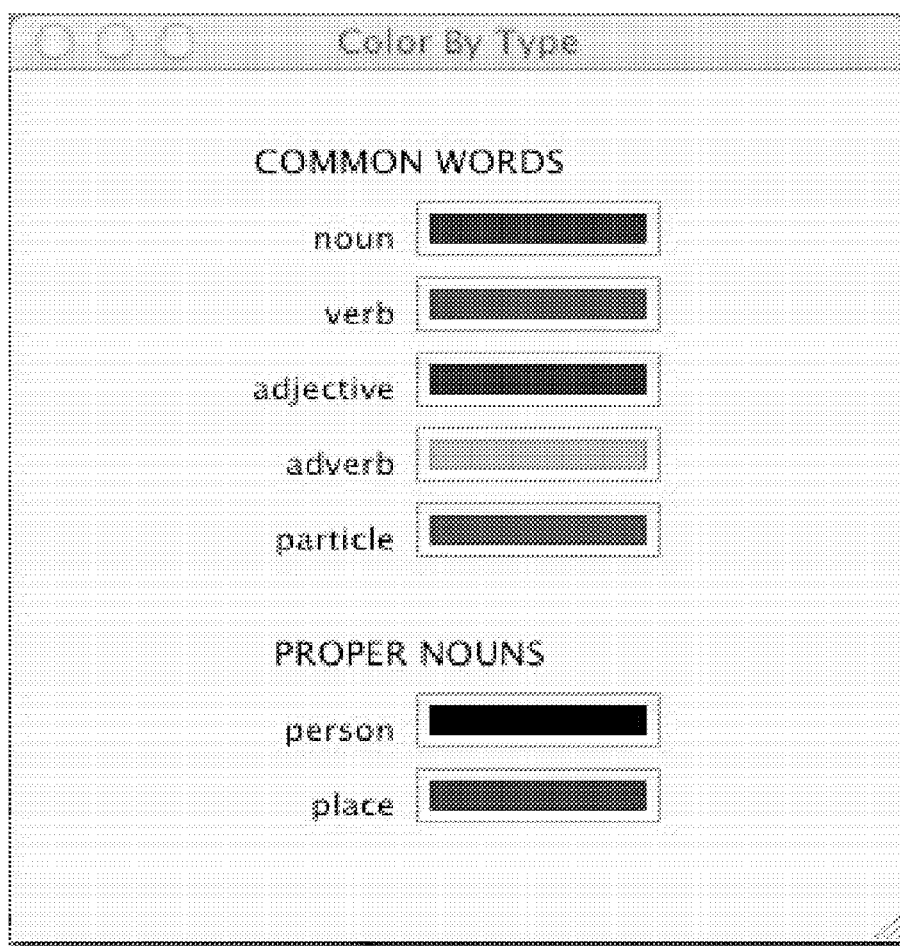
FIG. 3B shows an exemplary human-computer graphical user interface for permitting a user to color code search and input candidates by word class.

Moreover, provided that the linguistic data source used contains the appropriate fields, an embodiment can allow the user to distinguish candidate characters and words by type. For instance, the user can choose to distinguish common from proper nouns, or different parts of speech. These distinctions can be made in any of a variety of ways, including but not limited to font, color, bolding, and italics. Lexemes that have more than one type can be shown as color combinations, or distinguished by similar means. An example interface 304 facilitating this sort of selection is shown in FIG. 3B. To associate colors with word types, one chooses from among a number of possible categories, and then selects colors for the individual categories selected. It should be understood that the word types will differ by language, and those shown in the figure actually correspond better to English than any of the CJK languages, but are shown for the sake of familiarity.

Displaying Additional Lexical Information

Figure 3C:
FIG. 3C shows a diagram of an exemplary supplementary lexical data presentation during the search or input of a compound.

In addition, upon location of a set of homonyms matching the phonetic input of the user, the user has the option to display related dictionary links from the respective lexicons such that he may see explanations in the target language of input, or in a foreign language, all at the touch of a button (FIG. 3C). The former approach enables native users to determine which compound is correct given the context and intended meaning, whereas the latter is of great benefit to language learners who would rather read the input in their own native language. Because the dictionary information is linked to an embodiment but may be supplied by third parties, there is theoretically no limit to the amount of lexical detail that may be provided. In practice, the choice to access additional information should be easy to implement (as by pressing a key shortcut). Moreover, there should be a choice between simple and detailed explanatory settings if lexical sources permit such a distinction. Finally, a means may optionally be provided to select which lexical categories (fields of information) are displayed. FIG. 3C shows an interface 306 that provides the user with additional linguistic information. Actual implementations would provide far more sophisticated data than that shown in the figure.

Mouseover Effect

By switching from input mode to mouseover mode, this same pooling of lexical data can be applied to mouseover displays over text already typed onto the screen, a function that would be invaluable for students and learners of the target language. (Mouseover refers to the moving of a cursor over something on the screen. Generally, a trigger key may be required to activate the display of data during mouseover operations, but this is not necessarily the case, as a function key be used to toggle between normal and mouseover cursor behaviors.) When triggered, a popup windows would with lexical information so that the user can look up words easily in any compatible text on screen, regardless of whether it was entered by the user. The ability to look up lexical data pertaining to the mouseover target is made possible by the structuring of lexical data pooled in the system. For instance, the ability to view a translation in a second language is made possible by the ReverseLookupEntry entity (FIG. 2A); and the ability to look up relevant character data is made possible by the linking of GenericCharacter instances to GenericWord instances (FIG. 2A).

Figure 3D:
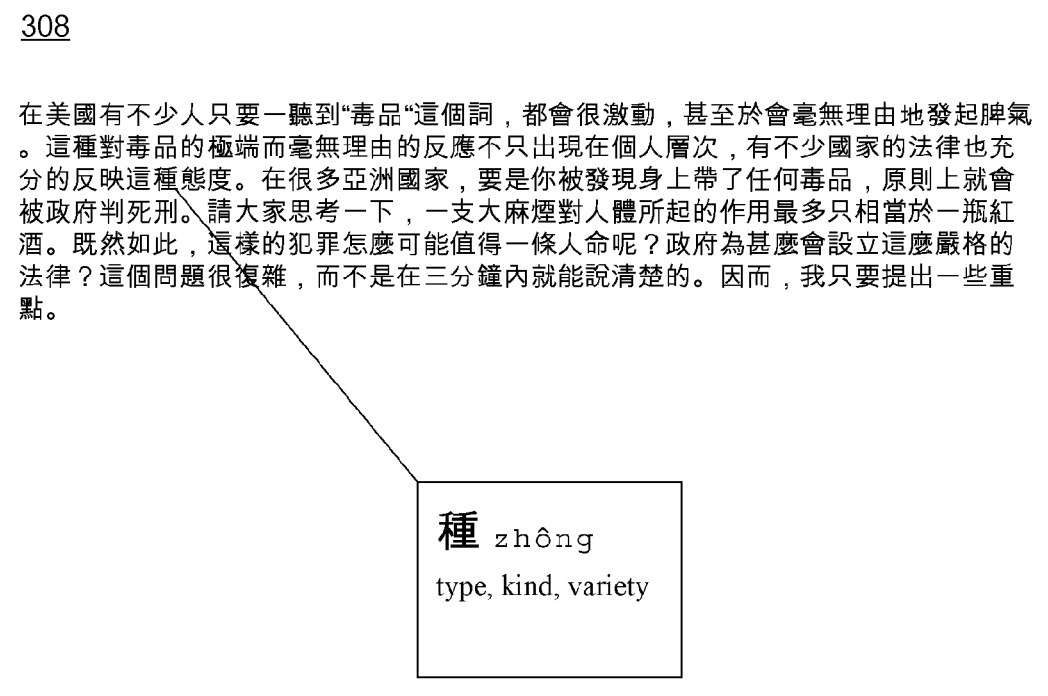

Operationally, to display information associated with a character already typed into the text, the user simply types a sequence of shortcut keys or, alternatively, selects a menu item that executes the retrieval of associated character information. FIG. 3D shows a simplified example of what such popup information 308 might look like, though the exact detail of data would depend on the lexical sources associate with character data in the system. FIG. 3E shows an exemplary grouping of lists of homonyms 310 according to a classifying feature such as radical or core component. In particular, FIG. 3E shows grouping first by core component and second by residual strokes, with a number-letter grid enabling input as using grid coordinates.

Activation and Deactivation of Words by Data Source

Referring to FIG. 2A, one can see that the SourceWord entity has an isActive attribute. This Boolean attribute enables one to fetch (query) all word data having a specific source name and activate or deactivate that collection in one batch. The user may choose to enable and disable any number of lexical data sources in the system using an interface like that in FIG. 2B. There are a variety of reasons one might to do this. For instance, in a fully developed system containing many different technical data sources, loading rarely used, say, medical dictionary information, may be senseless for someone whose profession requires him to input computer-related documentation.

Suppression of Candidates by Criterion

Because GenericWord and SourceWord instances have a variety of associated attributes, it is possible to restrict the presentation of candidates to a certain type, or alternatively, to suppress a certain word type during candidate presentation. Therefore, if the user wishes to search or input only for proper nouns, or only for place names, or person names, he or she can use a GUI of some kind to restrict the search. This will make it possible to present a far shorter candidate list. Similarly, to enhance performance, a user may simply want to deactivate the loading of words that are extremely rare, specifying a certain cutoff frequency. There is technically no limit to the kind of word type that can be specified, as all depends on the lexical data contained in the lists in question.

Shortcut keys, floating palettes, or menu items can all serve as means to provide the user with the ability to restrict searches to a particular word type. Any such means that provide this effect can be used. While easy to implement once the modeling has been implemented, this feature is a direct by-product of the specific data access capabilities of an embodiment, and may not possible under conventional systems or methods.

Candidate List Subdivision

When a user types in the reading of a word that he or she is looking for, it is not uncommon with CJK language input methods to end up having a large list of candidates on account of the large number of homonyms in these languages. This is especially true if the user attempts to enter a single character phonetically, but is also common with compounds (multi-character words) in Japanese or with compounds in Chinese if tonal designations are not employed. Scrolling through the list can then be extremely tedious, as inline input windows inevitably may simply present the data one row at a time. Typically such data is presented in order of frequency, but except for the most common words (which will be at the front of the list), such data may be of little help in locating the target. Because an embodiment can employ the additional data resources due to its inherent data structure flexibility, it is possible to instead use additional data about characters to subdivide the words and display them in a separate window vertically organized in some manner of the user's choosing. Thus, for instance, all words could be arranged in rows arranged in order of the radical of the word's starting character. Because users are familiar with the rough order of radicals, and because the radicals would be displayed, their eyes will quickly zoom in on the correct section. Within a "radical row" the words could be arranged in order of frequency.

While using the radical of the initial character may be the most logical choice for subdividing long candidate lists, another possible criterion to use would be the {stroke.endpoint} value of the core component of the starting character (see character lookup invention), or the stroke.endpoint value of the entire character, or even the total stroke count of the character.

The subdivision and redisplay of a candidate list is made possible by the fact that embodiments redistribute lexical data into a hierarchy of interrelated data entities, associating, for instance, character with data with compounds in a way not normally performed conventionally. It is preferable to have this feature triggered automatically when the number of candidates is greater than that normally displayed in a candidate window (generally about ten). Moreover, a means can be provided to enable the user to choose the criterion of list subdivision. In the case of subselecting words by radical, pre-processing of the contents of the lexemes in the system can be achieved by cross-referencing lexeme contents with a list of characters and their radical classification.

Figure 3F:
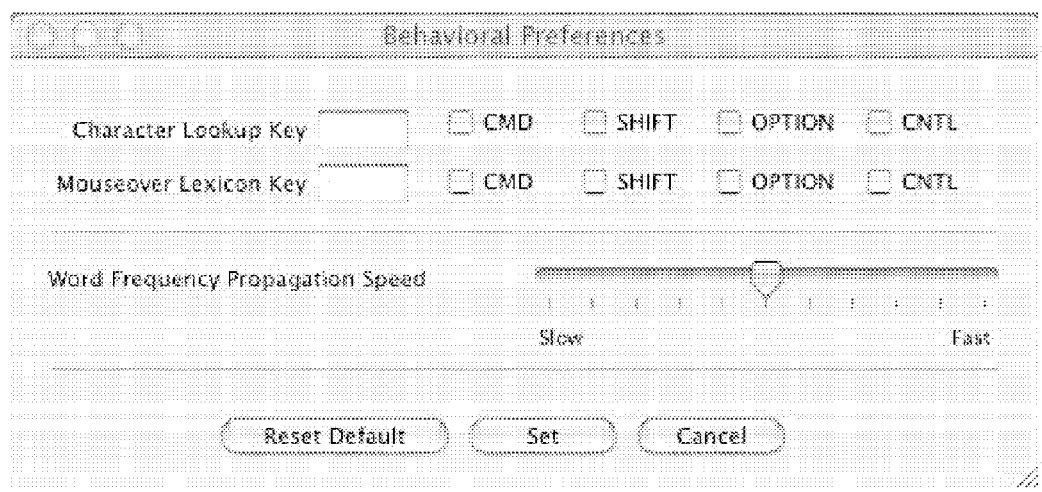
FIG. 3F shows an exemplary interface for setting the speed at which used words propagate up the data structure used to store them, as well as an exemplary method for controlling the keyboard shortcuts used for various functions associated with the input method.

FIG. 3F shows an example of candidate characters redistributed by appearance 312, the defining criterion being the core component notion described in the character lookup invention by the same author.

Tight Control Over Registration of Newly Discovered Words

Figure 4:
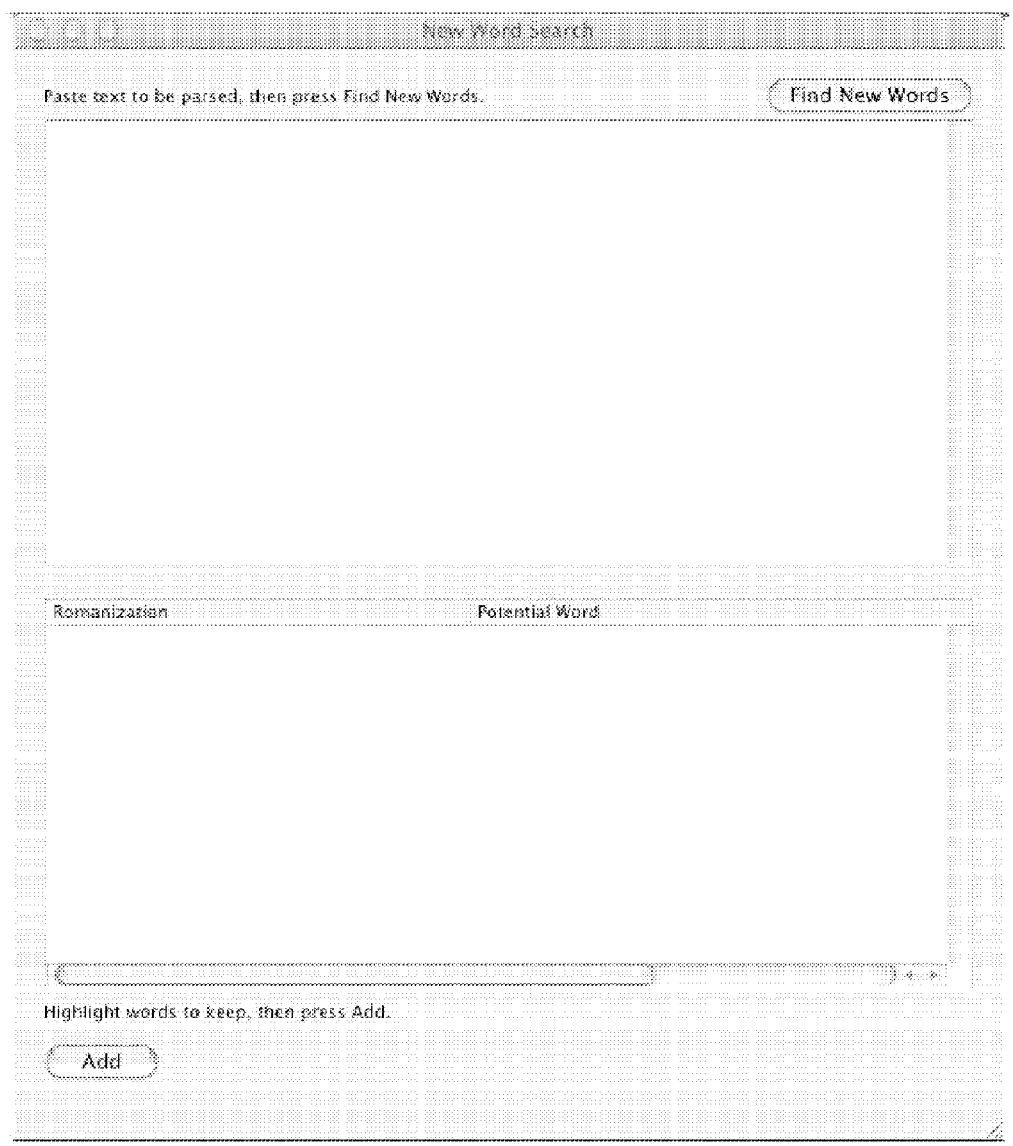
FIG. 4 shows an exemplary interface for parsing text and searching for words not contained in any of the data sources in which the lower portion lists candidate character sequences that may be selected for entry into a designated lexicon or other data store.

In addition to the features described above, an embodiment can provide means to automatically keep track of the words entered in previous text input sessions, and discerns new words that were not found via lexical searches but rather input individually as separate characters. At the user's convenience, characters and compounds (sequences of characters that form a word) that appear to be candidates for entry into a user dictionary will be presented to the user in a list with two fields: the characters, and their phonetic input, enabling the user to choose to accept some, all, or none of the candidates for entry into a user supplementary dictionary, modifying the data if necessary. Optionally, additional fields may be provided so that the user can input the part of speech, a definition, a foreign language equivalent, or some other lexical information according to the structure established for the lexicon used as the supplementary lexicon. FIG. 4 shows an interface 402 that could be used for choosing words for inclusion in the supplementary lexicon. Thus, novel character combinations are not only kept track of, but later listed so that the user may modify or improve on them, or provide associated lexical data, thereby formally choosing whether to retain the novel combinations permanently in the user lexicon. This level of user control can be far more effective than the automatic processes sometimes employed, which falsely conjoin characters that are not in fact words.

User-Driven Data Enhancement

Lexical data providers and vendors may update their data rather infrequently. As a result, it is common for new words and proper names to not be recognized by any of the currently available lexicons. To help address this time lag between the formation of new words, proper names, and other terms and their incorporation into accepted lexicons, this embodiment provides for the ability to pool user input data into a central location, thereby allowing linguists to examine patterns in the input data and update a communal user dictionary. An incentive may be set up for allowing users to participate in the program. Users may choose to download or otherwise install the communal user data by a variety of means. They are also free to ignore it and not activate the communal user data. Strict confidentiality about their data can be guaranteed. Accordingly, users concerned about the privacy of their text content, such as government agencies or high-tech corporations that use special confidential terms which they do not wish to disclose to the public, may enjoy the benefits of updates to the base lexicon without disclosing their own pool of new words.

In operation, to control the speed with which homonyms propagate within the data structure employed to store them, the user may use a GUI as shown in FIG. 3F. To add entries to a user-defined lexicon, at the end of an input session, the user may select a menu item or other trigger that automatically searches back through the previous words input and determine which words are not part of the collection of lexemes in the system. (These are words that would have been input character by character, or using some alternative input device such as a stylus, and which do not correspond to sequences in the lexeme collection.) The resulting list of potential new words can be displayed such that there is a selection means for choosing whether to include each word in the list. Words designated for entry are placed in a user lexicon, with options to designate supplementary information such as part of speech, word type (proper or common) (not shown). In addition, it is possible according to the present embodiment, to copy text obtained by any means (not simply typed by the user), and search for words not contained in the collection of lexemes in the system. In the same fashion such words may be accepted or rejected by the user.

Users who agree to allow their user data to be examined can have their data automatically uploaded to a specified website or other URL. Once a certain amount of data has been received, linguists can look for commonly input character sequences that form new words or proper nouns. Words considered acceptable for general use are then loaded into a communal user data file, which is made available to users. Users who do not wish to use this data may choose to deactivate it. Incorporation of new lexemes into the system is automatic upon activation, and all other functionality likewise takes place transparently.

Choice Over Degree of Tonal Representation or Spelling Accuracy

Within conventional input methods, the user generally must choose whether to input characters as with tone or without tone, or, alternately, the user typically has no choice, as the decision whether to input tones is made by the developer. In addition to the pooling of data into an aggregate collection of lexemes an embodiment may, based on the original input (which includes tonal data), create additional "shadow fields" (see FIG. 5A, 502) that provide for various degrees of tonal representation in Chinese, such that even with incomplete mastery of the tonal system, the user will have a good chance of finding the target words even if he or she has typed the tones in error. This is achieved by providing alternative fields that contain the same phonetic constituents but delete tone at different syllables, such that any possible combination is recognized as valid for the word. The user can then choose which degree of tonal specificity he intends to type in, and additional functionality may enable the user to change the tonal requirements on-the-fly. The on-the-fly functionality can be particularly important in cases where too many candidates are initially subselected. To achieve this functionality, shadow table are created with partial and no tonal designation; the full representation is that maintained by the collection of lexemes. A particularly important feature is the fact that it addresses the common confusion arising from tone sandhi, wherein two third-tone syllables in succession will sound identical to a combination of second and third tone syllables. Recognizing this issue, an embodiment can specifically provide for a margin of error in such third-third and second-third sequences such that the user can see alternatives if he or she has entered the wrong tonal sequence, and if no matches are found, alternates can be provided automatically.

To choose the degree of tonal designation, one can trigger a menu item, button, or other GUI to display a dialog box or other means where the user can designate the degree of tonal representation desired. FIG. 5A shows how words can be designated using no tones, partial tones, or full tones designations. Such flexibility enables the user, for instance, to use full tonal representation when secure in his or her knowledge of tones, and thus minimize the size of the candidate list. But when tonal knowledge is not secure, the user may indicate only fewer than the full spectrum of tones (there is one for each syllable), and thereby still have a good chance of finding the word. This functionality is provided by a GUI through which the user selects full, partial, or no tonal designation for Chinese input. Radio buttons (not shown) can be an approach to providing such an interface for the user.

Ability to Designate Encodings

A menu item, preference panel, or other selection means can be provided to enable the user to specify the encoding and language to be used during the current setting. Thus, for simplified Chinese input could employ GB or Unicode; for traditional Chinese, a choice of Big 5 or Unicode would be possible. For Japanese, one might choose between Unicode or shift-JIS or some other form of the JIS standards. For Korean, likewise, a choice between Unicode and another standard could be provided. FIG. 5B shows an interface 504 that enables the user to make such choices. To choose an encoding, the user can pull down a menu associated with the input means and choose the encoding to be specified for the language in question. In the case of an implementation that handles more than one East Asian character-based language, different defaults may be set for each language. Such a feature has never been provided in an input method to-date.

Additional Features

Additional features can be provided with embodiments. For example, it would be beneficial to provide shortcut keys for input, such that users could designate shortcuts for entering long proper names or unusual characters or the like. Likewise, embodiments may also provide a means to determine the speed at which word orders among homonyms changes as the user employs the system or method.

A modular linguistic service center embodiment may incorporate any combination of the above features and functions described in the previous embodiments, applying such features and functions to all four CJK scripts (except where a particular feature may be irrelevant to the script in question), and making it easy to switch among all three languages and all four scripts. (Note that Chinese has both simplified and traditional input characters, which is why the three languages have four scripts). Because the concepts described can apply to any language using Chinese-type characters, the same LSC system may be used, for instance, for Japanese speakers using Chinese, or English speakers using Chinese, or Chinese speakers using Japanese. In addition, the methods and systems can be used with other writing systems or symbolic graphical systems. In general, the systems and methods may be used with any language where the functionality of the systems and methods may be desired.

Incorporation of Additional NLP Modules

Thus far, the embodiments have focused on text input via an input method, which is traditionally realized by keyboard input. However, the present embodiment can incorporate other natural language processing (NLP) systems such as those used for voice synthesis (text-to-speech), voice recognition (speech-to-text), handwriting input, and optical character recognition. The result is a linguistic services center that integrates data from a variety of NLP systems. Because of the nature of the data used by these separate NLP systems, separate interfaces must be used to connect to the linguistic services center. Possible interfaces to connect NLP systems to the LSC are shown in the table below:

| System Type | Key Interface | Connection to LSC* |
|---|---|---|
| handwriting recognition | character | via CLI** |
| optical character recognition | character | via CLI |
| voice synthesis | inflected word | via MA*** |
| voice recognition | inflected word | via MA |
| input method | inflected word | via MA |

*LSC: linguistic services center
**CLI: character lookup module providing functionality of character lookup invention
*MA: morphological analyzer The advantage of using an aggregate collection of lexemes pooled from disparate lexical data sources as a core kernel of a linguistic services center is that data from alternate portions of the system can be used to enhance the functionality of other modules. For example, when using optical character recognition software to scan text, typically the OCR software allows the user to edit portions of the text where character interpretation may be incorrect. Integrating the data systems allows a user wishing to correct an OCR error to use the handwriting recognition module to find the correct character, or to employ the stroke-endpoint lookup strategy provided by the character lookup module (see FIG. 6**). Alternatively, the user could use standard text input (via the input method module) while screening for a particular part of speech, or using some other filter. Similarly, if inputting characters by hand, if the handwriting recognition software does not recognize a character, alternate means could be used to input the character.

A linguistic services center can also benefit data providers, as they can use one part of the system to see which elements are missing in the module they are developing. For example, an aggregate collection of lexemes based on a wide variety of sources will be quite large, and could be used to point out deficiencies in text-to-speech or speech-to-text conversion modules having impoverished recognition abilities. This embodiment can therefore provide a means to identify both matches and missing relations between two separate natural language processing modules.

LSC Interfaces: Characters and Phonemes

One of the keys to achieving the degree of flexible modularity described is to ensure that both interfaces—solitary character streams and inflected word streams—are clearly defined and adhered to by all participating modules. Thus, while it is possible for developers of a speech-to-text conversion module to include their own dictionary of words, it may be more efficient if they simply provide a stream of phonemes that can then be interpreted by the morphological analyzer provided in the linguistic services center. The implementation details of the speech-to-text conversion module may be of no concern to the LSC provider so long as the interface rules are clearly defined and adhered to.

Complementary Touchpad/Sketchpad

Finally, an ideal hardware configuration can be realized by incorporating a dual-function touchpad/sketchpad such that, when operating in absolute coordinate mode, a stylus could be used to input characters by hand, and when operating in relative coordinate mode, the touchpad could be used for normal cursor control. This would make it especially easy for the user to employ the handwriting recognition module whenever needed. A keyboard button or other means should be provided so that toggling between relative and absolute operation is quick and easy.

Another option achieving the same end is to place separate touch pads to the right and left of the normal centered touchpad. These outside touchpad's would be activated only upon being contacted with a stylus, and would be used exclusively for absolute-coordinate mode, that is, for entering characters using a stylus.

A third alternative is to design a touchpad-event response system such that touchpad output is interpreted differently depending on the event responder. Thus, if the active area on screen is a character input receiving section in a character lookup module, stylus input would be interpreted in absolute coordinates. Otherwise, it would be interpreted in relative coordinates, that is, as coordinates for normal cursor control.

In any event, some form of touchpad-sketchpad input would greatly complement the standard keyboard-driven input of the input method module, thereby making it easy for find characters or words in cases where the aggregate lexeme collection does not have the word or character in question.

In operation, the provision of a linguistic services center, and connection between different natural language processing modules, operation will be described with reference to FIG. 6.

Figure 6:
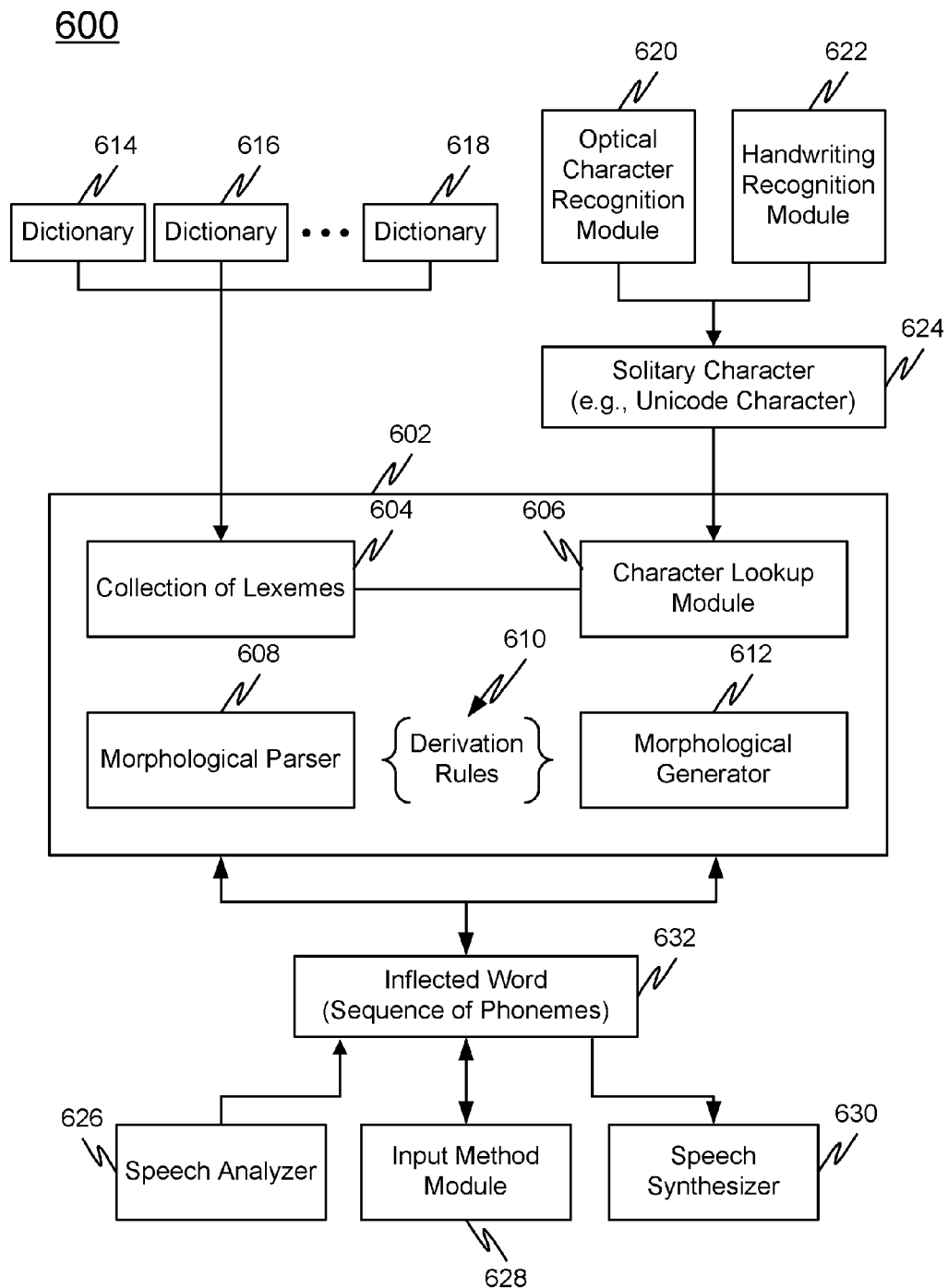
FIG. 6 shows a diagram of the various components of an exemplary linguistic services system (or center) embodiment, including primary interfaces between various natural language processing modules contained therein and the linguistic services system.

FIG. 6 shows the overall configuration of elements of the linguistic services center (LSC). In particular, a linguistic system 600 includes an LSC 602 having a collection of lexemes 604, character lookup module 606, morphological parser 608, derivation rules 610 and a morphological generator 612. Coupled to the LSC 602 is a plurality of dictionaries (or lexical data sources) 614-618. Also coupled to the LSC 602 are an optical character recognition module 620 and a handwriting recognition module 622, both of which can be used to generate a solitary character 624 (e.g., a Unicode character) for lookup using the LSC 602. A speech analyzer 626, an input method module 628 and a speech synthesizer 630 are coupled to the LSC 602 and can each be used to provide an inflected word (e.g., a sequence of phonemes) to the LSC 602. Components are shown for one language only, but of course an LSC for each language would contain the same or similar components. As shown in the diagram, the contents of a number of lexicons (labeled "Dictionary" 614-618) are integrated into the lexeme collection.

There are two primary interfaces to the external natural language processing modules: solitary characters (e.g., Unicode-encoded), and inflected words (represented as a sequence of phonemes represented in some form of phonological notation). The OCR and handwriting recognition modules 620 and 622 interface with solitary characters, meaning that they attempt to identify individual characters one after another. Any corrections needed to interpretations made by those modules can be efficiently performed because of the direct link the character lookup module. Modules may be implemented in software, hardware, or a combination of both.

The other interface, inflected words, enables connections to a speech synthesizer module 630 and a speech analyzer module. Speech synthesis is performed by taking text (not shown), running it through the LSC's morphological analyzer (in particular, the parser and derivation rules), and then returning to the synthesizer for conversion from sequence of phonemes to audible sound. By contrast, the speech analyzer module 626 would present sequences of phonemes, the parser identifies individual citation forms from the input text using derivation rules and finds matching vocabulary in the collection of lexemes in the system. The generator takes matching vocabulary and re-inflects candidate words for presentation to the user.

The advantage of the system is that the LSC does not have to handle details about speech synthesis or speech analysis, per se, so long as the corresponding modules read or provide inflected words as a sequence of phonemes. Likewise, the LSC does not have to concern itself with the various algorithms or neural networks employed to realize optical character or handwriting recognition, so long as those modules provide interpretations in the form of sequences of individual characters. Provided that they conform to the interfaces shown in the figure, both sets of external modules can nonetheless benefit from the wealth of data provided by the LSC.

Figure 7:
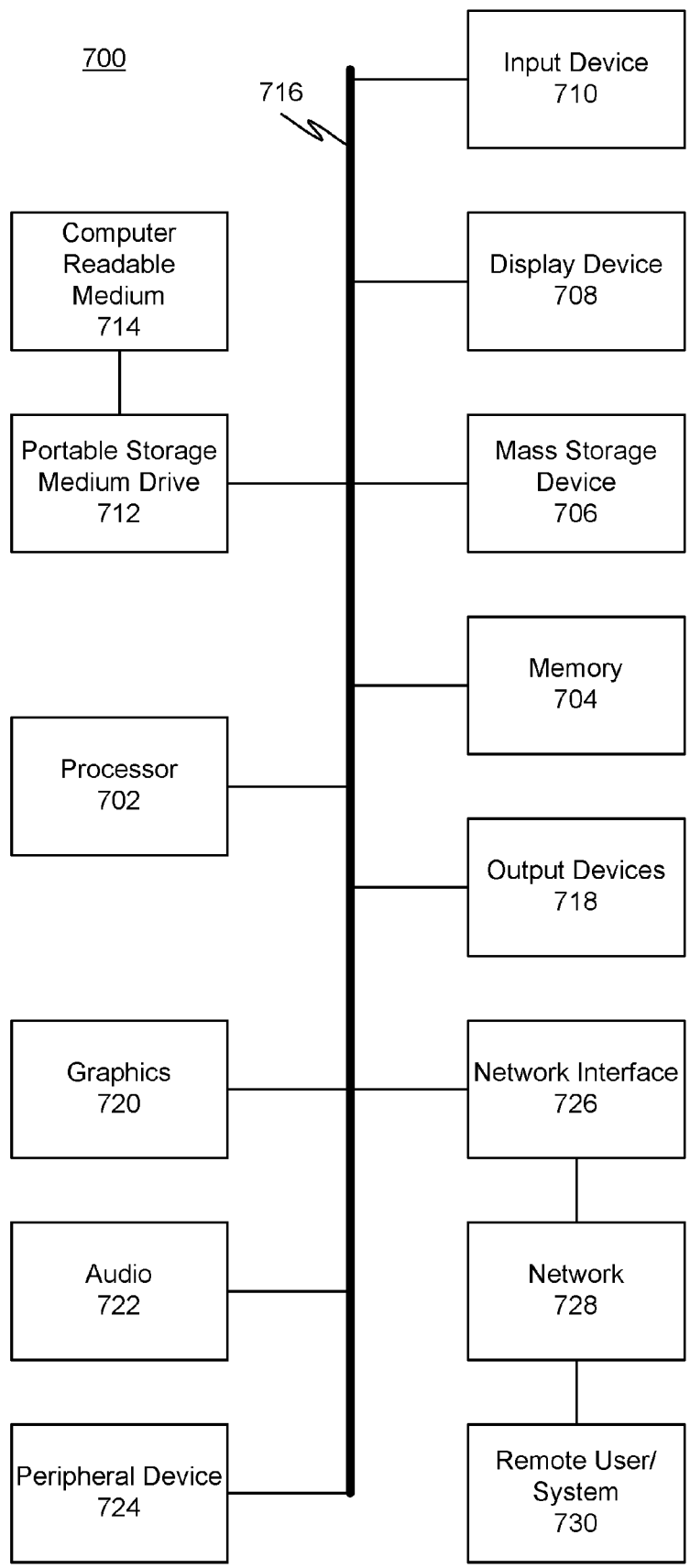
FIG. 7 is a block diagram of an exemplary computer system to implement one or more embodiments of a method or system.

FIG. 7 shows an exemplary computer system suitable for implementation of one or more embodiments. The computer system 700 of FIG. 7 includes a processor 702 and memory 704. Processor 702 may contain a single microprocessor, or may contain a plurality of microprocessors for configuring the computer system as a multi-processor system. Memory 704, stores, in part, instructions and data for execution by processor 702. If the system of the present invention is wholly or partially implemented in software, including a computer program, memory 704 can be used to store the executable code when in operation. Memory 704 may include banks of dynamic random access memory (DRAM) as well as high speed cache memory.

The system of FIG. 7 further includes a mass storage device 706, peripheral device(s) 724, input device(s) 710, portable storage medium drive(s) 712, computer readable medium 714, a graphics subsystem 720 and a display 708. For purposes of simplicity, the components shown in FIG. 7 are depicted as being connected via a single bus 716. However, the components may be connected through one or more data transport means. For example, processor 702 and memory 704 may be connected via a local microprocessor bus, and the mass storage device 706, peripheral device(s) 724, portable storage medium drive(s) 712, and graphics subsystem 720 may be connected via one or more input/output (I/O) buses. Mass storage device 706, which is typically implemented with a magnetic disk drive or an optical disk drive, is a non-volatile storage device for storing data and instructions for use by processor 702. In another embodiment, mass storage device 706 stores the computer program implementing the method of the present invention. The method of the present invention also may be stored in processor 702.

Portable storage medium drive 712 operates in conjunction with a portable non-volatile storage medium, such as a floppy disk, or other computer-readable medium, to input and output data and code to and from the computer system of FIG. 7. In one embodiment, the method of the present invention is stored on such a portable medium, and is input to the computer system 700 via the portable storage medium drive 712. Peripheral device(s) 724 may include any type of computer support device, such as an input/output (I/O) interface, to add additional functionality to the computer system 700. For example, peripheral device(s) 724 may include a network interface card for interfacing computer system 700 to a network, a modem, and the like.

Input device(s) 710 provide a portion of a user interface (UI). Input device(s) 710 may include an alpha numeric keypad for inputting alpha numeric and other key information, or a pointing device, such as a mouse, a trackball, stylus or cursor direction keys, or an image capture camera, or an OCR. All such devices provide additional means for interfacing with and executing the method of the present invention. In order to display textual and graphical information, the computer system 700 of FIG. 7 includes graphics subsystem 720 and display 708. Display 708 may include a cathode ray tube (CRT) display, liquid crystal display (LCD), other suitable display devices, or means for displaying, that enables a user to view the execution of the inventive method. Graphics subsystem 720 receives textual and graphical information and processes the information for output to display 708. Display 708 can be used to display component interfaces and/or display other information that is part of a user interface. The display 708 provides a practical application of the method of the present invention since the method of the present invention may be directly and practically implemented through the use of the display 708 and the input device(s) 710. The system 10 of FIG. 7 also includes an audio system 722. In one embodiment, audio system 722 includes a sound card that receives audio signals from a microphone that may be found in peripherals 724. Additionally, the system of FIG. 7 includes output devices 718. Examples of suitable output devices include speakers, printers, and the like.

The system of FIG. 7 also includes a network interface 726 coupled to a network 728 (e.g., the internet). A remote user or system 730 can access the classification and retrieval method executing on the processor 702 from across the network, The devices contained in the computer system of FIG. 7 are those typically found in general purpose computer systems, and are intended to represent a broad category of such computer components that are well known in the art. The system of FIG. 7 illustrates one platform which can be used for practically implementing the method of the present invention. Numerous other platforms can also suffice, such as Macintosh-based platforms available from Apple Computer, Inc., platforms with different bus configurations, networked platforms, multi-processor platforms, other personal computers, portable platforms (such as handheld electronic dictionaries, translators, or the like), workstations, mainframes, navigation systems, and the like.

Alternative embodiments in conjunction with the computer system 700 further include using other display means for the monitor, such as CRT display, LCD display, projection displays, or the like. Likewise, any similar type of memory, other than memory 704, may be used. Other interface means, in addition to the component interfaces, may also be used including alpha numeric keypads, other key information or any pointing devices such as a mouse, trackball, stylus, cursor or direction key.

A further embodiment includes a computer program product which is a storage medium (media) having instructions stored thereon/in which can be used to program a computer to perform the method of interfacing of the present invention. The storage medium can include, but is not limited to, any type of disk including floppy disks, optical disks, DVD, CD ROMs, magnetic optical disks, RAMs, EPROM, EEPROM, magnetic or optical cards, or any type of media suitable for storing electronic instructions.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems and user applications. Ultimately, such computer readable media further includes software for performing the method of interfacing of the present invention as described above.

A user device or system for executing a method or implementing an electronic dictionary or LSC as described above can be a portable electronic device such as one (or a combination of more than one) of the following: a web-enabled device; a wireless telephone handset (e.g., Apple IPhone®); a personal digital assistant (PDA) such as a Blackberry®, Palm® computing device or the like; a handheld computer; a portable electronic dictionary; a laptop computer (or other type of portable computer such as a tablet computer); a smart phone; a media recorder such as a digital camera or digital video recorder; a digital media player such as an IPod®, an mp3 player, or a electronic book reader; a handheld game console; a personal navigation device; a converged device, or the like. The user device can also be a desktop computer such as an IBM-compatible personal computer (PC) or an Apple Mac®. In general, any now known or later developed device or combination of devices that can carry out the functions described above can be used with an embodiment of the present invention.

A software embodiment of the present invention can be purchased (or requested without charge, depending upon the application provider) and downloaded to a user device via a wired or wireless network. The AppStore by Apple is an example of a system for downloading software to portable devices.

Revenue Sharing/Data Security Overview

An embodiment can make it possible to merge lexicons or lexical databases provided by different data providers and containing different data structures for use in a modular linguistic services system. Initially, this would appear to present a quandary, as generally speaking, different preparers of lexical data or NLP modules are competitors. Why would they want to pool their data or modules in one system? This problem is solved by four features of an embodiment that can make marketing the system commercially viable:

1) a data description model (including descriptive codes) and parsing system (including header files) as described above, which thus enables data with varied structures to be incorporated into one system, together with a corresponding application framework for incorporating and displaying lexical data from third parties;

2) data security achieved through encryption and locking of data files from disparate sources;

3) a one-stop shopping and demo capability, thus making a wide variety of conforming lexical data sources available to the user; and 4) mutually beneficial financing—a revenue sharing system that can make an LSC embodiment financially attractive for both the licensor of the LSC system and the sellers of lexical data which enables both to take advantage of the enormous gains to be made by incorporating such an LSC into an OS and making disparate sources of lexical data available.

It is this unique combination of elements that make the data-sharing model of the input method system feasible. Three of these key aspects—namely, data security, one-stop shopping and demo capabilities, and mutually-beneficial financing (revenue sharing), are described below.

Figure 9:
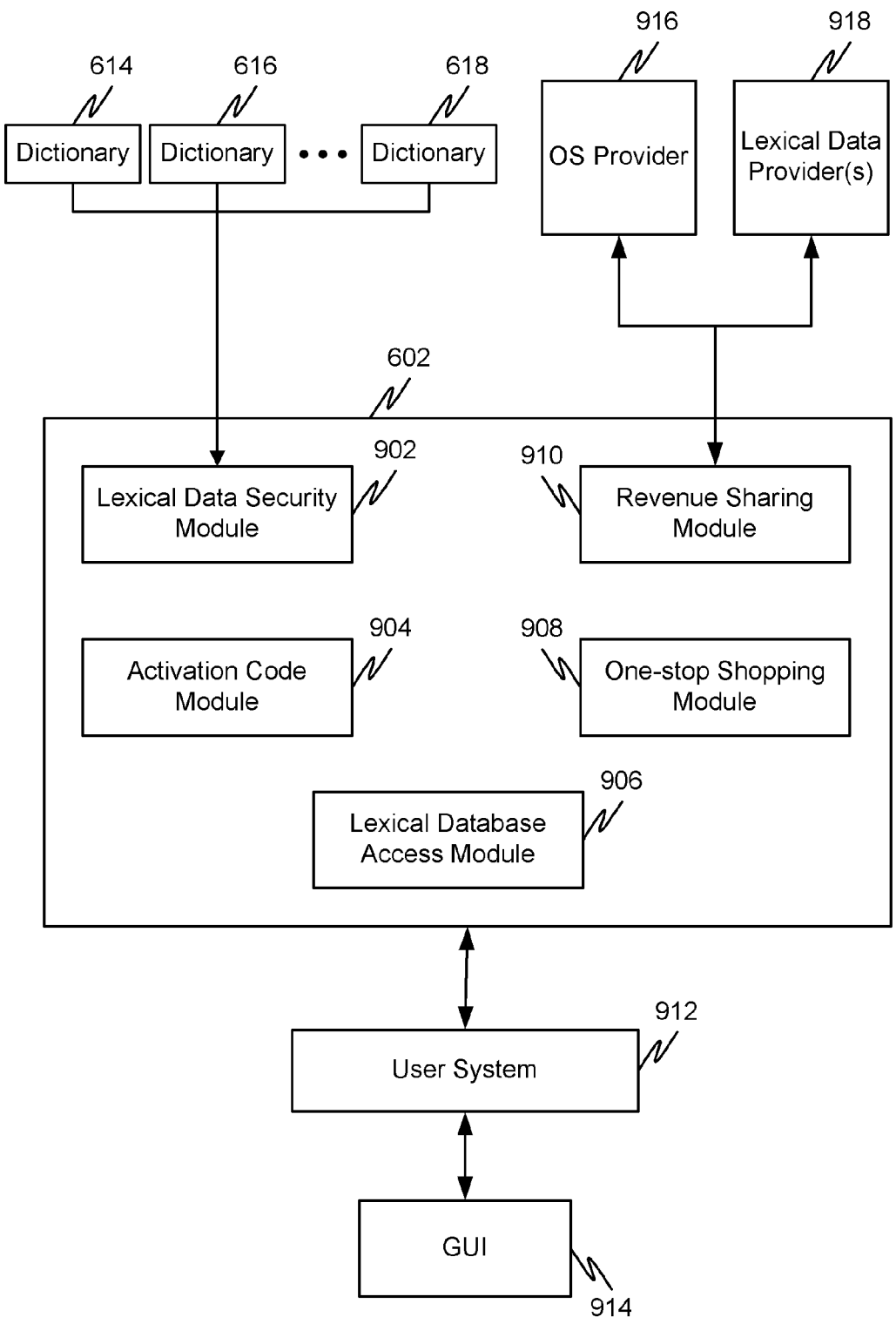
FIG. 9 is a block diagram of an LSC with revenue sharing and data security features.

FIG. 9 is a diagram of an exemplary LSC with revenue sharing and data security features. In particular, the system 900 includes an LSC 602 having, in addition to the components described above in connection with FIG. 6, a lexical data security module 902, an activation code module 904, a lexical database access module 906, a one-stop shopping (or ecommerce) module 908, and a revenue sharing module 910. Also coupled to the LSC 602 are a user system 912 having a graphical user interface 914. The user system may be integrated with the LSC, may be connected locally or may be remote. The graphical user interface can be used to display the various user interface screens and elements described above.

Also coupled to the LSC are an OS provider 916 and a lexical data source provider 918, which can receive revenue sharing information from the revenue sharing module 910 of the LSC 602. The operation of the various components is discussed below.

Data Security

Because data from different lexical data providers will be obtained and made available to the user side by side on the same computer, it is essential that providers of lexical data sources feel secure that their data cannot be compromised. Otherwise, one dictionary maker could illegally incorporate the data from another dictionary maker into their own database. An embodiment safeguards data by providing the following features:

1) Each LSC system on any given computer has a unique ID which ties it to the computer on which it is used.

2) Each lexical data source incorporated into the LSC system has its own ID and key, which is distinct from other lexical data sources on the system.

3) Except for the user dictionary (which contains only words that the user himself identified and incorporated into the system), lexicons installed in the system cannot be copied and used on another system, because their security key will be married to that computer's LSC unique key.

4) When not in use, all lexical data files can be encrypted using, for example, blowfish, two-fish, or some other encryption algorithm.

5) Whenever lexical data files are being used by the LSC, the lexical data files are locked so that they cannot be viewed by some outside program or user.

Thus, at any given time, the lexical data files may be either encrypted (when not in use) or locked (when in use). Moreover, they cannot be copied from one computer to another because they can only work when provided a unique access key at initial installation. This key is provided at the time of first demo use or first installation (if the demo option is not employed).

One-Stop Shopping and Demo Capability

Naturally users may not be willing to immediately spend a great deal of money on additional input method dictionaries if they do not have some sense of how much adding a lexicon will improve data input and other LSC system functionality. At the same time, in the current business practice, lexical data sources can be hard to find, as they come from disparate sources and may not always even be made available in electronic format.

To address this potential drawback, a "one-stop shopping" capability can be provided such that all lexical data sources conforming to the present LSC system can be found in one location, for example on an installation CD that accompanies the OS installation software, or at a website dedicated to providing downloads of lexical data sources. The lexical sources pertaining to the language that the user wants may then be downloaded in encrypted format.

If users wish to demo a lexicon, then it is provided a "marriage key" for the computer in question, meaning that lexicon file will never be usable on another computer. Following that, the LSC apparatus then decrypts the file and incorporates it into the lexeme collection, but the Source-Words for that lexicon are assigned a deactivation date. Once the deactivation date is reached, that lexicon may no longer be used, and its entries are removed from the lexeme collection. If the user chooses to purchase the lexicon, then the lexicon is given a reactivation key, and from that point on, it may be used on the computer in question permanently.

Any number of standard encryption algorithms may be employed for the present approach to data security, and the actual implementation will be platform-dependent. Ideally, all databases will have a separate key so that in the unlikely event that one key is discovered, the others will not be compromised. However, it has readily been shown that encryption can be made secure enough to make this an unlikely avenue of attack for would-be hackers. Thus, it matters little whether a blowfish or two-fish algorithm is used, so long as sufficient security is provided to prevent stealing of lexical data. And because the activation and reactivation (post-demo) codes are unique to the computer on which the data is installed, it is impossible for people to share an activation or reactivation code.

At the same time, any other type of NLP module may be made available at the one-stop system. Modules must conform to the LSC interfaces described above. Thus, a variety of text-to-speech, speech-to-text, input methods, handwriting recognition, and optical character recognition modules could be made additionally available in this manner.

Revenue Sharing

To make the preparation and hosting of the LSC system satisfactory for both the OS provider and the lexical data providers, a variety of financial arrangements can be arranged. However, preferably, for each lexicon purchased, the OS provider would receive a small royalty percentage to help offset the price of licensing the LSC system. The lexicon provider would also be given a small royalty percentage. The LSC system licensor can either be paid by the OS provider directly or receive a similar royalty percentage for each lexicon purchased. It is the "win-win" financing or revenue sharing that will motivate the OS maker to incorporate the LSC and lexicon providers to provide their data. Further, if external NLP module developers adhere to the interface Payment Method and Payment Guarantee Payment is ideally made over the Internet so that the user may obtain a permanent activation code for the lexicon in question. Any temporary demo activation codes may be provided free of charge, but they provide only limited use or accessibility, with a means provided to terminate even such limited use as desired. Ideally, the lexicon provider and OS provider and LSC system provider are all notified when a purchase has been made, so that there can be no dispute as to how much royalties will be provided.

As a matter of safety and to ensure that no trickery is employed by any of the three parties, when a user pays for a lexicon, a confirmation code can be provided by all three parties. The employment of separate confirmation codes ensures that each party will be notified when a lexicon is purchased, and thus ensures that each party will know that they are receiving their agreed-upon share of the profits.

In operation, the user downloads or installs lexicon models from the Web or an installation CD. He or she then chooses to demo (if so desired) the product, upon which a demo-activation key is provided. At this point, the lexical data is "married" to the unique LSC on the system. Words from the downloaded lexicon are temporarily stored in the collection of lexemes in the system. When the demo period expires, the data is removed from that collection.

The user may then purchase the lexicon. Upon purchasing, the OS provider, lexicon provider, and LSC services provider are notified of the purchase. A reactivation (permanent) key is provided, and the data is once again incorporated into the lexeme collection. Ideally the reactivation key is purchase on-line, though off-line transactions may also be made available for those lacking access.

The user may choose which sets of differentiated data are to be made automatically available, and which to keep hidden by default. For block data, there is no such choice. Block data is shown as one unit, if chosen for display.

Additional purchases of lexical data follow the same principle, with data being incorporated into the collection of lexemes in the system as described in earlier embodiments.

Additional NLP modules may be purchased. Provided that they conform to the interfaces described above, they may all take advantage of the lexical data pooled in the linguistic services center.

In another embodiment, non-CJK languages can be incorporated into the linguistic systems. Although embodiments discussed above have focused on the needs of East Asian language learners and users, many of the features of the Linguistic Services Center (LSC) can in fact be applied with equal success to users and learners of other languages, including those whose writing systems are based on some form alphabetical script. Thus, for example, both a computer-based and a handheld electronic device-based version of the LSC could be applied to Western languages. To this end, the data used for the collection of lexemes in the system would need to be ordered on spellings conforming to the script in question.

For the most part, the same basic framework and data structures could be applied as in the CJK-oriented LSC system described above. However, implementation for non-CJK systems would require a few modifications, as shown in FIG. 7.

The handwriting recognition module, optical character recognition module, and input method module would all interface with text streams, preferably represented in the standard orthography of the language in question. Perceived sequences of letters would be tested against the morphological parser for actual spellings. (This differs from the CJK system in that the CJK systems employ a romanization buffer (pinyin, romaji, or the like) to represent the sounds of what is being input.) Meanwhile, the text-to-speech and speech-to-text modules interface with the same kind of phonemic streams as in the CJK version, only in this case the representation is most likely not going to be actual spellings but some form of phonetic or phonemic representation. Because of the phenomenon of homonyms, it is important that such a representation be mapped to each and every possible word when spelled out. (For example, in some English dialects cot and caught sound the same but have the same phonemic representation. Thus, the phonemic representation would map to both words.) To make this possible, the collection of lexemes in the system must also have not only actual orthographic spellings but also phonemic stream equivalents that would be recognized by a text-to-speech or speech-to-text module. Similarly, derivation rules would include the ability to represent inflections and derivations in both the standard orthography (spelling system of the language) and phonemic representation used in the phonemic streams interface. The relations of the NLP modules to these interfaces with the LSC are shown in FIG. 7. (Note that if the aim of the system were, say, to provide English assistance to native Chinese speakers, then a character-based interface could also be included as was the case with the CJK version).

A variety of features not normally implemented in standard input methods could be applied to non-CJK embodiments. For instance, by tracking user input, it would be possible to assess the user's vocabulary usage, and to compare that with standard frequency counts. Doing so could be instructive, especially if it became apparent that the user had large or surprising gaps in vocabulary (something that is not uncommon with second language learners). Grammar or spelling assistance would also be available on-the-fly, given that each word input would be tested against the morphological parser. Words not matching any expected inflected form could thereupon be flagged for review, and possible matches could be provided on-the-fly in a separate floating palette or other GUI. The user would have instant access to dictionaries, and as some of the dictionaries might be bilingual, the user could look up words in reverse, as in the CJK version. In short, there are a good number of possible instructional advantages to applying such an approach for learners of non-CJK languages that parallel those attained when implementing a CJK-oriented LSC.

In summary, an LSC can accommodate input methods and other NLP modules for languages other than Chinese, Japanese, and Korean.

It should be appreciated that any steps described above may be repeated in whole or in part in order to perform a contemplated linguistic data management task. Further, it should be appreciated that the steps mentioned above may be performed on a single or distributed processor. Also, the processes, modules, and units described in the various figures of the embodiments above may be distributed across multiple computers or systems or may be co-located in a single processor or system.

Embodiments of the method, system and computer program product (i.e., software) for linguistic data management, may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic device such as a PLD, PLA, FPGA, PAL, or the like. In general, any process capable of implementing the functions or steps described herein can be used to implement embodiments of the method, system, or computer program product for linguistic data management.

Furthermore, embodiments of the disclosed method, system, and computer program product for linguistic data management may be readily implemented, fully or partially, in software using, for example, object or object-oriented software development environments that provide portable source code that can be used on a variety of computer platforms. Alternatively, embodiments of the disclosed method, system, and computer program product for linguistic data management can be implemented partially or fully in hardware using, for example, standard logic circuits or a VLSI design. Other hardware or software can be used to implement embodiments depending on the speed and/or efficiency requirements of the systems, the particular function, and/or a particular software or hardware system, microprocessor, or microcomputer system being utilized. Embodiments of the method, system, and computer program product for linguistic data managing can be implemented in hardware and/or software using any known or later developed systems or structures, devices and/or software by those of ordinary skill in the applicable art from the functional description provided herein and with a general basic knowledge of the computer and/or linguistic arts.

Moreover, embodiments of the disclosed method, system, and computer program product for linguistic data management can be implemented in software executed on a programmed general-purpose computer, a special purpose computer, a microprocessor, or the like. Also, the linguistic data management systems and methods can be implemented as a program embedded on a personal computer such as a JAVA® or CGI script, as a resource residing on a server or graphics workstation, as a routine embedded in a dedicated processing system, or the like. The methods and systems can also be implemented by physically incorporating the methods for linguistic data management into a software and/or hardware system, for example a computer software program, an electronic dictionary and/or translator.

It is, therefore, apparent that there is provided in accordance with the present invention, a method, system, and computer program product for linguistic data management. While this invention has been described in conjunction with a number of embodiments, it is evident that many alternatives, modifications and variations would be or are apparent to those of ordinary skill in the applicable arts. Accordingly, applicant intends to embrace all such alternatives, modifications, equivalents and variations that are within the spirit and scope of this invention.

What is claimed is:

1. A modular lexical system for searching or inputting Chinese-like characters and words, the system having a processor configured to perform operations comprising:
   receiving input from a user to link or unlink one or more of a plurality of lexical data sources, each lexical data source having an independent data structure;
   generating one or more data structures for storing data from one or more of the lexical data sources in a plurality of data storage sections;
   indicating a structure of the stored data in one of the data storage sections;
   integrating the stored data in each data storage section into hierarchical data structure;
   creating an aggregate collection of lexemes, said collection of lexemes comprising an aggregate of all search keys and corresponding data found in the lexical data sources, together with cross-references to the lexical data sources in which said keys are found;
   designating, in response to user input, a subset of lexical data to be used;
   creating an activated subset of lexical data, said activated subset comprising a subset of the lexeme collection corresponding to the lexical data tables designated for use by the user, wherein each record corresponds to a phonetic or phonological search key for which the retrieved values correspond to character or word objects having an orthographic realization and additional lexical data as provided via the originating lexicon;
   retrieving individual records of lexical data from said lexical data sources such that all said sources may contribute candidates for input to the input means when a search key has been provided;
   displaying said candidates for selection by the user during word search and text input;
   generating a summary table that includes a basic nature and characteristic of individual lexicons stored in the system; and
   displaying information contained in said summary table.

2. The modular lexical system of claim 1, further comprising:
   a table of morphological derivation rules that delineates inflections and derivations possible for each type of word class found in a language corresponding to the lexical data;
   a morphological parser that identifies possible word stems and corresponding citation forms out of text input by the user using said derivation rules; and
   a morphological generator that converts candidate words from their citation forms to the inflected form corresponding to said text input by the user,
   wherein the system recognizes and suggests candidates based on potential matches in the lexeme collection and taking into account inflection or derivation input by the user.

3. The modular lexical system of claim 1, further comprising:
   a first text buffer for holding previously input text;
   an analysis module to automatically analyze said input text and remove from said text buffer any portions of said input text that correspond to words whose derivation can be determined based on said derivation rules and the citation forms in the lexeme collection;
   a second text buffer to store remaining portions of the input text as unidentified lexemes;
   a first graphical user interface to enable the user to select which remaining portions to retain and add to a supplementary lexicon;
   a second graphical user interface that enables the user to associate lexical information with said remaining portions for storage in said supplementary lexicon; and
   storage means for storing said new lexemes as user data together with any said additional lexical data associated with said lexemes input by said user,
   wherein words and characters not corresponding to any entry in the lexeme collection are identified and stored for later use.

4. The modular lexical system of claim 3, wherein the additional lexical data includes one or more of a lexeme reading, a meaning, a second language translation, a definition, a word form, a word subtype, and etymological data.

5. The modular lexical system of claim 1, further comprising:
   means for uploading user data to a central location;
   means for performing an examination of user data from a plurality of users to determine repeating patterns of input for incorporation into a communal user data lexicon; and
   means for downloading said communal user data lexicon for use in the system,
   wherein the lexical database can be continuously expanded to include new words, proper nouns, and other terms entering a language associated with the lexical database.

6. The modular lexical system of claim 1, further comprising:
   means for encrypting lexical data files when said files are not in use;
   means for decrypting said lexical data files when said files are in use; and
   means for locking said lexical data files when decrypted and in use,
   wherein said data files may not be examined or otherwise explored via applications other than the system, and
   wherein proprietary lexical data is safeguarded through the encrypting and locking.

7. The modular lexical system of claim 1, further comprising:
   means to enable text input candidates to be looked up using a word having the same meaning in an alternate language,
   wherein whenever one or more bilingual or multilingual data sources is incorporated into the system, the user can find words via a language other than the target input language.

8. The modular lexical system of claim 1, further comprising:
   filter means for filtering word searches so that candidate search results are filtered by some criterion selected by the user, said criterion including at least one of a word class, membership in proper noun class, membership in place name class, a frequency cutoff, and a technical field of origin, wherein the resulting filtered candidate list includes characters or words corresponding to the filter applied.

9. The modular lexical system of claim 1, further comprising:

means for looking up characters using a combination of a stoke-endpoint value pair and recurring components.

10. The modular lexical system of claim 1, further comprising:

means for color-coding or otherwise distinguishing text input candidates according to a criteria, the criteria including one or more of word class, word subclass, or origin of lexical data source.

11. The modular lexical system of claim 1, further comprising:

means for displaying associated lexical data corresponding to a word or character stored within said system when the user places the cursor in mouseover mode over the word or character displayed on the screen.

12. The modular lexical system of claim 1, further comprising:

a graphical user interface for selecting whether to group characters by radical or core component, the characters being classified according to the selection;

shortcut means to trigger grouping by radical;

shortcut means to trigger grouping by core component;

display means to display a radical or core component in bold or color at the head of a row, with characters or words classified by that radical or core component following in the row, wherein lists of homophonic candidate characters are grouped according to their constituent radical or core component, and wherein lists of homophonic candidates are grouped according to the constituent radical or core component of the first character of the candidate.

13. The modular lexical system of claim 1, further comprising:

a set of alternative reading fields that store lexeme readings with less precise data, including less precise tonal designations or common spelling mistakes;

means for indicating a degree of tonal representation or spelling accuracy required when inputting text using said system, wherein a user with less secure knowledge of lexeme tones is provided with a greater margin of error during text input, and more advanced users can be given fewer candidates during text input.

14. The modular lexical system of claim 1, further comprising:

a graphical user interface that enables the user to choose the type of encoding used for input.

15. The system of claim 1, wherein the input language is one employing a letter-based writing system instead of Chinese-type characters.

16. A computerized dictionary for learners and users of languages employing Chinese-type characters, the dictionary comprising:

a processor;

an input device for a user to provide input to the dictionary, the input device being coupled to the processor;

a display device for viewing choices and displayed data, the display device being coupled to the processor;

a memory coupled to the processor;

linking control means for linking and unlinking lexical data sources in response to user input;

table creation means for creating separate tables for storing plain or block data sources;

data structure creation means for creating complex data structures for storing differentiated data sources;

a data structure flag stored in the memory to indicate the structure of the data being stored, said flag differentiating between plain, block, and differentiated data;

retrieval means for retrieving individual records of lexical data from said lexical data sources such that said sources may contribute candidates for input when a search key has been provided;

summary table creation means for generating a summary table that summarizes the basic nature and characteristics of individual lexicons stored in the system;

summary display means for displaying the information contained in said summary table;

means for creating a collection of lexemes based on a plurality of different data sources, said lexeme collection comprising an aggregate of each search key found in the individual lexical data sources and cross-references to data specific to the lexical data stores in which said keys are found;

means for designating which lexical data sources are to be used at a given time in response to user input;

means for indicating an activated subset of the lexeme collection, said activated subset comprising a subset of the total lexeme collection corresponding to the lexical data tables designated for use by the user;

means for enabling lexical data corresponding to a word or character stored within said input method and apparatus to be displayed when the user places a cursor over the word or character displayed on the display device; and means for displaying data originating from different lexicons if more than one match is found during the implicit search conducted during mouseover mode.

17. The computerized dictionary claim 16, wherein the input language is one employing a letter-based writing system instead of Chinese-type characters.

* * * * *